US012729288B2

(12) United States Patent
Styer

(10) Patent No.: US 12,729,288 B2
(45) Date of Patent: Sep. 8, 2026

(54) TIRE HAVING TREAD OF SPECIFIED RUBBER COMPOSITION AND RELATED METHODS

(71) Applicant: Bridgestone Americas Tire Operations, LLC, Nashville, TN (US)

(72) Inventor: Justin James Styer, Munroe Falls, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 743 days.

(21) Appl. No.: 17/755,633

(22) PCT Filed: Nov. 5, 2020

(86) PCT No.: PCT/US2020/059114

§ 371 (c)(1),
(2) Date: May 4, 2022

(87) PCT Pub. No.: WO2021/092175

PCT Pub. Date: May 14, 2021

(65) Prior Publication Data

US 2023/0357543 A1 Nov. 9, 2023

Related U.S. Application Data

(60) Provisional application No. 62/931,343, filed on Nov. 6, 2019.

(51) Int. Cl.

| | |
|---|---|
| ***C08L 7/00*** | (2006.01) |
| ***B60C 1/00*** | (2006.01) |
| ***C08L 47/00*** | (2006.01) |

(52) U.S. Cl.

CPC .............. *C08L 7/00* (2013.01); *B60C 1/0016* (2013.01); *C08L 47/00* (2013.01)

(58) Field of Classification Search

CPC ...... C08L 7/00; C08L 9/00; C08L 9/06; C08L 61/14; B60C 1/0016; C08G 8/30

See application file for complete search history.

(56) References Cited

U.S. PATENT DOCUMENTS

| | | | |
|---|---|---|---|
| 6,201,059 | B1 | 3/2001 | Wideman et al. |
| 6,221,990 | B1 | 4/2001 | Blok et al. |
| 6,228,944 | B1 | 5/2001 | Blok et al. |
| 6,242,550 | B1 | 6/2001 | Kralevich, Jr. et al. |
| 6,245,873 | B1 | 6/2001 | Wideman et al. |
| 6,265,478 | B1 | 7/2001 | Kralevich, Jr. et al. |
| 6,274,685 | B2 | 8/2001 | Blok et al. |
| 6,281,317 | B1 | 8/2001 | Kralevich, Jr. et al. |
| 6,300,448 | B2 | 10/2001 | Wideman et al. |
| 6,300,449 | B2 | 10/2001 | Wideman et al. |
| 6,316,567 | B1 | 11/2001 | Kralevich, Jr. et al. |
| 6,348,539 | B1 | 2/2002 | Wideman et al. |
| 6,357,499 | B1 | 3/2002 | Kralevich, Jr. et al. |
| 7,084,228 | B2 | 8/2006 | Labauze et al. |
| 7,371,791 | B2 | 5/2008 | Hattori et al. |
| 7,825,183 | B2 | 11/2010 | Robert et al. |
| 7,834,074 | B2 | 11/2010 | Brunelet et al. |
| 7,882,874 | B2 | 2/2011 | Robert et al. |
| 8,324,310 | B2 | 12/2012 | Robert et al. |
| 8,362,118 | B2 | 1/2013 | Mihara |
| 8,450,424 | B2 | 5/2013 | Koelle et al. |
| 8,507,582 | B2 | 8/2013 | Takizawa |
| 8,598,258 | B2 | 12/2013 | Sato |
| 8,614,276 | B2 | 12/2013 | Voge et al. |
| 8,637,606 | B2 | 1/2014 | Pille-Wolf et al. |
| 8,697,793 | B2 | 4/2014 | Goto |
| 8,710,140 | B2 | 4/2014 | Pialot et al. |
| 8,871,832 | B2 | 10/2014 | Takizawa |
| 8,957,132 | B2 | 2/2015 | Voge et al. |
| 9,034,980 | B2 | 5/2015 | Recker et al. |
| 9,133,371 | B2 | 9/2015 | Sandstrom |
| 9,139,721 | B2 | 9/2015 | Sugiura |
| 9,150,712 | B2 | 10/2015 | Takizawa et al. |

(Continued)

FOREIGN PATENT DOCUMENTS

| | | | |
|---|---|---|---|
| CA | 2819910 | C | 6/2012 |
| CA | 2868136 | C | 10/2013 |

(Continued)

OTHER PUBLICATIONS

International Preliminary Report on Patentability and Written Opinion from PCT/US2020/059114, dated May 10, 2022, 8 pages.
International Search Report from PCT/US2020/059114, dated Feb. 26, 2021, 4 pages.
Extended European Search Report from application EP 20883936, dated Nov. 23, 2023, 6 pages.
International Preliminary Report on Patentability and Written Opinion from PCT/US2020/059118, dated May 10, 2022, 8 pages.
International Search Report from PCT/US2020/059118, dated Feb. 26, 2021, 5 pages.
Extended European Search Report from application EP 20883844, dated Nov. 23, 2023, 6 pages.
International Preliminary Report on Patentability and Written Opinion from PCT/US2020/059121, dated May 10, 2022, 8 pages.

(Continued)

*Primary Examiner* — Robert S Jones, Jr.
*Assistant Examiner* — Elizabeth Amato
(74) *Attorney, Agent, or Firm* — Meredith E. Hooker; Jenny L. Sheaffer

(57) ABSTRACT

Disclosed herein are tires having a tread with improved stiffness made from a rubber composition of specified ingredients including an elastomer component, a resin component including a terpene phenol resin having a specified hydroxyl value and a DCPD-based resin, a filler component including reinforcing silica filler and carbon black, optionally a liquid plasticizer, and a cure package. Also disclosed are methods for improving the stiffness of a tire tread by using a resin component comprising a terpene phenol resin having a specified hydroxyl value and a DCPD-based resin in a rubber composition comprising an elastomer component, a filler component including reinforcing silica filler and carbon black, optionally a liquid plasticizer, and a cure package.

18 Claims, No Drawings

(56) References Cited

U.S. PATENT DOCUMENTS 9,243,133 B2 1/2016 Voge et al.
9,254,614 B2 2/2016 Takahara
9,260,600 B2 2/2016 Takeda
9,284,439 B2 3/2016 Takeda
9,365,703 B2 6/2016 Miyazaki
9,393,837 B2 7/2016 Voge et al.
9,416,258 B2 8/2016 Takeda et al.
9,416,259 B2 8/2016 Mathey et al.
9,441,098 B1 9/2016 Isitman et al.
9,493,638 B2 11/2016 Sugiura et al.
9,505,920 B2 11/2016 Sun et al.
9,631,074 B2 4/2017 Peters et al.
9,657,161 B2 5/2017 Saintigny et al.
9,677,025 B2 6/2017 Voge et al.
9,757,987 B2 9/2017 Jacoby et al.
9,758,652 B2 9/2017 Washizu
9,790,353 B2 10/2017 Takahashi et al.
9,796,826 B2 10/2017 Miyazaki
9,796,836 B2 10/2017 Kamada
9,840,569 B2 12/2017 Blok et al.
9,873,780 B1 1/2018 Sandstrom
9,884,924 B2 2/2018 Blok et al.
10,040,927 B2 8/2018 Takeda
10,059,815 B2 8/2018 Soisson et al.
10,059,825 B2 8/2018 Harris et al.
10,072,138 B2 9/2018 Naka et al.
10,081,699 B2 9/2018 Sato et al.
10,087,313 B2 10/2018 Iizuka
10,087,314 B2 10/2018 Khripin et al.
10,160,847 B2 12/2018 Lesage et al.
10,174,185 B2 1/2019 Otsuki
10,196,504 B2 2/2019 Sandstrom
10,214,638 B2 2/2019 Belin et al.
10,246,576 B2 4/2019 Peters et al.
10,273,352 B2 4/2019 Amino et al.
10,279,626 B2 5/2019 Isitman et al.
10,450,454 B2 10/2019 Sugimoto et al.
2007/0037908 A1 2/2007 Pille-Wolf
2009/0062433 A1 3/2009 Yamamoto
2010/0256275 A1 10/2010 Lopitaux
2011/0190416 A1 8/2011 Maesaka et al.
2013/0158185 A1 6/2013 Thompson
2013/0203890 A1* 8/2013 Lopitaux ............... B60C 1/0016
523/156
2013/0267640 A1 10/2013 Lopez et al.
2013/0274404 A1 10/2013 Vasseur et al.
2013/0338256 A1 12/2013 Steiner
2014/0135437 A1 5/2014 Sandstrom et al.
2014/0144566 A1 5/2014 Miyazaki
2014/0155519 A1 6/2014 Ringot et al.
2014/0171557 A1 6/2014 Ringot
2014/0235751 A1 8/2014 Lesage et al.
2014/0243448 A1 8/2014 Lesage et al.
2014/0371346 A1 12/2014 Saintigny et al.
2015/0087745 A1 3/2015 Chekanov et al.
2015/0218305 A1 8/2015 Washizu et al.
2015/0283854 A1 10/2015 Saintigny et al.
2015/0329704 A1 11/2015 Miyazaki et al.
2016/0031190 A1 2/2016 Greiveldinger et al.
2016/0052340 A1 2/2016 Miyazaki et al.
2016/0059522 A1 3/2016 Greiveldinger et al.
2016/0075864 A1 3/2016 Takeda
2016/0177070 A1* 6/2016 Galizio .................... C08K 3/22
524/21
2016/0272796 A1 9/2016 Washizu et al.
2016/0280972 A1 9/2016 Bandyopadhyay
2016/0304698 A1 10/2016 Bindschedler et al.
2016/0304718 A1 10/2016 Bindschedler et al.
2016/0312015 A1 10/2016 McDowell et al.
2016/0319116 A1 11/2016 Labrunie et al.
2016/0376426 A1 12/2016 Kimura
2017/0037225 A1 2/2017 Isitman et al.
2017/0066910 A1 3/2017 Miura
2017/0130036 A1 5/2017 Kushida
2017/0166732 A1 6/2017 Isitman et al.
2017/0174876 A1 6/2017 Maejima
2017/0190888 A1 7/2017 Pille-Wolf
2017/0198122 A1 7/2017 Rodgers
2017/0204256 A1 7/2017 Labrunie et al.
2017/0204257 A1 7/2017 Labrunie et al.
2017/0218187 A1 8/2017 Ringot
2017/0232795 A1 8/2017 Isitman et al.
2017/0247531 A1 8/2017 Reuvekamp et al.
2017/0253730 A1 9/2017 Nakajima et al.
2017/0283518 A1 10/2017 Maejima et al.
2017/0291450 A1* 10/2017 Izumo ..................... C08L 57/02
2017/0291451 A1 10/2017 Tanabe et al.
2017/0313858 A1 11/2017 Tanaka et al.
2017/0313860 A1 11/2017 Takenaka et al.
2017/0355835 A1 12/2017 Nakajima
2017/0369680 A1 12/2017 Saintigny et al.
2018/0002498 A1 1/2018 Mcdowell
2018/0056717 A1 3/2018 Yang
2018/0105681 A1* 4/2018 Pille-Wolf ............ C08G 61/02
2018/0134080 A1 5/2018 Ikeda
2018/0154696 A1 6/2018 Isitman et al.
2018/0163030 A1 6/2018 Kamada
2018/0215911 A1 8/2018 Hamaguchi
2018/0237631 A1 8/2018 Sugimoto et al.
2018/0264882 A1 9/2018 Mcdowell et al.
2018/0297406 A1 10/2018 Yokoyama
2018/0362740 A1 12/2018 Hamamura et al.
2019/0040240 A1 2/2019 Miyazaki et al.
2019/0062534 A1 2/2019 Broemmel et al.
2019/0062537 A1 2/2019 Mejia et al.
2019/0085156 A1 3/2019 Sakura
2019/0092937 A1* 3/2019 Pan ....................... B60C 1/0025
2019/0100652 A1 4/2019 Gillen et al.
2019/0144643 A1 5/2019 Lee
2019/0233625 A1 8/2019 Bergmann
2019/0264011 A1 8/2019 Tochika
2019/0322844 A1 10/2019 Stroomer et al.
2019/0367707 A1 12/2019 De Gaudemaris et al.
2020/0055336 A1 2/2020 Sakurada
2020/0055964 A1 2/2020 Yamamoto
2020/0056016 A1 2/2020 Sakurada
2020/0086686 A1 3/2020 Fleury et al.
2020/0101795 A1 4/2020 Sakurada et al.
2020/0123346 A1 4/2020 Nakagawa et al.
2020/0130338 A1 4/2020 Ishikawa et al.
2020/0139761 A1 5/2020 Moriyama et al.
2020/0157269 A1 5/2020 Matmour et al.
2020/0199413 A1 6/2020 Abe
2020/0346492 A1 11/2020 Maesaka
2021/0171746 A1 6/2021 Sugimoto et al.

FOREIGN PATENT DOCUMENTS

CA 2969106 C 6/2016
CA 2971124 C 6/2016
CA 3008805 C 6/2017
EP 2799480 A1 * 11/2014 ............... C08K 3/04
EP 2743301 B1 1/2016
EP 2104705 B1 5/2017
EP 3228657 A1 10/2017
EP 3238657 A1 11/2017
EP 3263360 A1 * 1/2018 ........... B60C 1/0016
EP 3006226 B1 12/2018
EP 3303467 B1 7/2019
EP 3511179 A1 7/2019
EP 3259312 B1 9/2019
EP 3350259 B1 9/2019
EP 3448899 B1 4/2020
EP 3237524 B1 7/2020
EP 3350260 B1 7/2020
EP 3532308 B1 7/2020
EP 3532309 B1 7/2020
EP 3489033 B1 8/2020
EP 3478515 B1 10/2020
EP 3532310 B1 10/2020
EP 3583164 B1 12/2020
EP 3083769 B1 2/2023
JP 2016027176 A 2/2016
JP 2017190364 A 10/2017

(56) References Cited

FOREIGN PATENT DOCUMENTS

| | | | | |
|---|---|---|---|---|
| JP | 2019123760 A | 7/2019 | | |
| KR | 10-1775624 B1 | 9/2017 | | |
| WO | 2016/106418 A1 | 6/2016 | | |
| WO | 2016109476 A1 | 7/2016 | | |
| WO | 2018/004579 A1 | 1/2018 | | |
| WO | 2018002539 A1 | 1/2018 | | |
| WO | 2018042879 A1 | 3/2018 | | |
| WO | WO-2018125654 A1 * | 7/2018 | ............... | B60C 7/10 |

OTHER PUBLICATIONS

International Search Report from PCT/US2020/059121, dated Feb. 26, 2021, 4 pages.
Extended European Search Report from application EP 20885718, dated Nov. 23, 2023, 6 pages.
Tamanol 803L, Standard Specifications, downloaded Aug. 14, 2019, 4 pages.
Pinova Brochure, DRT Resins, downloaded Aug. 14, 2019, 4 pages.
Dertophene T 105, Technical Data Sheet, dated Sep. 8, 2021, 1 page.
Dertophene T115, Technical Data Sheet, dated Sep. 8, 2021, 1 page.
Dertophene 1510, Typical Product Specifications, downloaded Aug. 14, 2019, 1 page.
Dertophene H150, Typical Product Specifications, downloaded Aug. 14, 2019, 1 page.
Third party submission from application JP 2022-525841, submitted Aug. 2023 (34 pages).
Third Party Submission with English translation submitted in Japanese Application No. 2020-525843, Nov. 13, 2023.
Third Party Submission with English translation submitted in Japanese Application No. 2022-525847, Jun. 25, 2024, 78 pp.
Azechi, Toshio et al., “Dispersion and Flocculation Behavior of Silica Particles in Rubber Matrix,” Japanese Journal of Polymer Science and Technology, Apr. 2006, pp. 234-240, vol. 63, No. 4, with English translation, 16 pp.
Matsuda, Takaaki, “Recent Technological Trends of Styrene-butadiene Rubber,” Journal of The Society of Rubber Science and Technology, Japan, 2005, pp. 46-50, vol. 78, No. 2.

* cited by examiner

TIRE HAVING TREAD OF SPECIFIED RUBBER COMPOSITION AND RELATED METHODS

This application is a national stage application of PCT/US2020/059114 filed on Nov. 5, 2020, which claims the benefit of U.S. Provisional Application Ser. No. 62/931,343 filed on Nov. 6, 2019, each of which are incorporated herein by reference in their entirety.

FIELD

The present application is directed to tires having a tread of a specified rubber compositions and related methods.

BACKGROUND

Tires comprise many components including a road-contacting tread. The particular ingredients used to prepare the rubber composition which comprises the tire tread may vary. Formulation of tire tread rubber compositions is a complex science since changes to the formulation which result in an improvement in one property (e.g., wet performance) may result in deterioration of another property (e.g., stiffness).

SUMMARY

Disclosed herein are tires having a tread of a specified rubber composition and related methods.

In a first embodiment, a tire is provided which comprises a tread having improved wet performance and improved stiffness and is made from a rubber composition comprising: (a) 100 parts of an elastomer component including at least one rubber selected from the group consisting of styrene-butadiene copolymer, polybutadiene, natural rubber, and polyisoprene, (b) 20 to 60 phr of a resin component comprising (i) a terpene phenol resin having a hydroxyl value of 80 or greater, preferably 90 or greater, more preferably 100 or greater, and (ii) a DCPD-based resin, wherein the terpene phenol resin (i) comprises a majority by weight of the resin component, (c) a filler component comprising (i) 91 to 140 phr of a reinforcing silica filler, preferably 100 to 130 phr, and (ii) 1 to 20 phr, preferably 5 to 10 phr of a carbon black filler, (d) 0 to 30 phr of a liquid plasticizer, and (e) a cure package.

In a second embodiment, a method is provided for improving the wet performance and stiffness of a tire tread comprising incorporating 20 to 60 phr of a resin component comprising (i) a terpene phenol resin having a hydroxyl value of 80 or greater, preferably 90 or greater, more preferably 100 and (ii) a DCPD-based resin, wherein the terpene phenol resin (i) comprises a majority by weight of the resin component, into a tire tread rubber composition comprising 100 parts of an elastomer component including at least one rubber selected from the group consisting of styrene-butadiene copolymer, polybutadiene, natural rubber, and polyisoprene; a filler component comprising 91 to 140 phr of a reinforcing silica filler and 1 to 20 phr, preferably 5 to 10 phr of a carbon black filler; 0 to 30 phr of a liquid plasticizer; and a cure package, thereby producing a tire tread rubber composition.

DETAILED DESCRIPTION

In a first embodiment, a tire is provided which comprises a tread having improved wet performance and improved stiffness and is made from a rubber composition comprising: (a) 100 parts of an elastomer component including at least one rubber selected from the group consisting of styrene-butadiene copolymer, polybutadiene, natural rubber, and polyisoprene, (b) 20 to 60 phr of a resin component comprising (i) a terpene phenol resin having a hydroxyl value of 80 or greater, preferably 90 or greater, more preferably 100 or greater, and (ii) a DCPD-based resin, wherein the terpene phenol resin (i) comprises a majority by weight of the resin component, (c) a filler component comprising (i) 91 to 140 phr of a reinforcing silica filler, preferably 100 to 130 phr, and (ii) 1 to 20 phr, preferably 5 to 10 phr of a carbon black filler, (d) 0 to 30 phr of a liquid plasticizer, and (e) a cure package.

In a second embodiment, a method is provided for improving the wet performance and stiffness of a tire tread comprising incorporating 20 to 60 phr of a resin component comprising (i) a terpene phenol resin having a hydroxyl value of 80 or greater, preferably 90 or greater, more preferably 100 and (ii) a DCPD-based resin, wherein the terpene phenol resin (i) comprises a majority by weight of the resin component, into a tire tread rubber composition comprising 100 parts of an elastomer component including at least one rubber selected from the group consisting of styrene-butadiene copolymer, polybutadiene, natural rubber, and polyisoprene; a filler component comprising 91 to 140 phr of a reinforcing silica filler and 1 to 20 phr, preferably 5 to 10 phr of a carbon black filler; 0 to 30 phr of a liquid plasticizer; and a cure package, thereby producing a tire tread rubber composition. The method of the second embodiment can also be understood as a method for improving the wet performance and stiffness of a tire tread using a rubber composition according to the first embodiment disclosed herein.

Definitions

The terminology as set forth herein is for description of the embodiments only and should not be construed as limiting the invention as a whole.

As used herein, the term "BR" or "polybutadiene" refers to homopolymer of 1,3-butadiene.

As used herein, the term "majority" refers to more than 50% (e.g., at least 50.1%, at least 50.5%, at least 51%, etc.).

As used herein, the term "minority" refers to less than 50% (e.g., no more than 49.5%, no more than 49%, etc.).

As used herein, the abbreviation Mn is used for number average molecular weight.

As used herein, the abbreviation Mp is used for peak molecular weight.

As used herein, the abbreviation Mw is used for weight average molecular weight.

Unless otherwise indicated herein, the term "Mooney viscosity" refers to the Mooney viscosity, $ML_{1+4}$. As those of skill in the art will understand, a rubber composition's Mooney viscosity is measured prior to vulcanization or curing.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, the term "phr" means parts per one hundred parts rubber. The one hundred parts rubber is also referred to herein as 100 parts of an elastomer component.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein the term "SBR" means styrene-butadiene copolymer rubber.

As used herein, the term "tread," refers to both the portion of a tire that comes into contact with the road under normal inflation and load as well as any subtread.

Rubber Composition of the Tire Tread

As mentioned above, the first and second embodiments disclosed herein are directed to a tire comprising a tread having improved stiffness and made from a specified rubber composition and to a method for improving the stiffness of a tire tread by producing a specified rubber composition. The rubber compositions are used in preparing treads for tires, generally by a process which includes forming of a tread pattern by molding and curing one of the rubber compositions. Thus, the tire treads will contain a cured form of one of the rubber compositions. The rubber compositions may be present in the form of a tread which has been formed but not yet incorporated into a tire and/or they may be present in a tread which forms part of a tire.

Elastomer Component

As mentioned above, according to the first and second embodiments, the rubber composition for the tire tread includes 100 parts of an elastomer component which includes at least one rubber selected from the group consisting of styrene-butadiene copolymer, polybutadiene, natural rubber, polyisoprene, and combinations thereof. The total amount of 100 parts of elastomer or rubber is used so that the amount of other ingredients may be listed in amounts of phr or the number of parts per hundred parts of rubber (or 100 parts of the elastomer component). As a non-limiting example, for a rubber composition containing 25 parts of styrene-butadiene rubber, 55 parts of polybutadiene, 20 parts of natural rubber, and 110 parts of reinforcing silica filler, the amount of silica filler can also be described as 110 phr. In certain embodiments of the first and second embodiments, the 100 parts of elastomer component includes at least one styrene-butadiene copolymer rubber, at least one polybutadiene rubber, and at least one of natural rubber or polyisoprene. In certain such embodiments, only one of each of the foregoing rubbers is used for the elastomer component, i.e., one SBR, one BR, and one of natural rubber of polyisoprene. In certain embodiments of the first and second embodiments, the elastomer component includes at least 40 parts of natural rubber, 10-40 parts of polybutadiene having a cis-bond content of at least 95% and a Tg of less than −101° C., and 10-40 parts of styrene-butadiene copolymer rubber. In other embodiments of the first and second embodiments, the elastomer component includes at least 60 parts of polybutadiene rubber having a cis-bond content of at least 95% and a Tg of less than −101° C. In yet other embodiments of the first and second embodiments, the elastomer component includes at least 20 phr, preferably 30-60 phr of an SBR having a silica-reactive functional group, as discussed in more detail below.

In certain embodiments of the first and second embodiments, the 100 parts of elastomer component consists (only) of rubbers selected from styrene-butadiene copolymer, polybutadiene, natural rubber, polyisoprene, and combinations thereof. In other embodiments of the first and second embodiments, the 100 parts of elastomer component includes one or more additional rubbers. According to the first and second embodiments, when one or more additional rubbers is present, the amount will generally be limited, preferably to no more than 20 parts (e.g., 20 parts, 15 parts, 10 parts, 5 parts, or less), no more than 15 parts (e.g., 15 parts, 10 parts, 5 parts, or less), or no more than 5 parts (e.g., 5 parts, 4 parts, 3 parts, 2 parts, 1 part, or less). In certain embodiments of the first and second embodiments, one or more additional rubbers are selected from diene monomer-containing rubbers. In certain embodiments, the one or more additional rubbers (iv) are selected from the group consisting of styrene-isoprene rubber, butadiene-isoprene rubber, styrene-isoprene-butadiene rubber, butyl rubber (both halogenated and non-halogenated), ethylene-propylene rubber (EPR), ethylene-butylene rubber (EBR), ethylene-propylene-diene rubber (EPDM), and combinations thereof.

Styrene-Butadiene Copolymer Rubber

According to the first and second embodiments, when one or more styrene-butadiene copolymer rubbers are used, the particular styrene-butadiene copolymer(s) and the amount thereof that is used in the elastomer component of the rubber composition for tire treads may vary. One or more than one (e.g., two or three) styrene-butadiene copolymer rubbers may be used. In certain embodiments of the first and second embodiments, the elastomer component includes at least 20 phr (e.g., 20 phr, 30 phr, 40 phr, 50 phr, 60 phr, 70 phr, 80 phr, etc.) of a styrene-butadiene copolymer rubber. In certain other embodiments of the first and second embodiments, the elastomer component includes a majority by weight of a styrene-butadiene copolymer rubber (e.g., 51 phr or more, 60 phr or more, 70 phr or more, 51-80 phr, 51-70 phr, 60-80 phr, etc.). According to the first and second embodiments, the styrene-butadiene copolymer rubber may be functionalized or non-functionalized. As used herein, the term functionalized should be understood to encompass the use of both functional groups and coupling agents. One or more than one type of functional group may be utilized for each SBR. Generally, a functional group may be present at the head of the polymer, at the tail of the polymer, along the backbone of the polymer chain, or a combination thereof. Functional groups present at one or both terminals of a polymer are generally the result of the use of a functional initiator, a functional terminator, or both. Alternatively or additionally, the functional group may be present as a result of coupling of multiple polymer chains using a coupling agent (as described below). In certain preferred embodiments of the first and second embodiments, the rubber component includes at least one styrene-butadiene copolymer rubber that is functionalized, preferably with a silica-reactive functional group. In certain embodiments of the first and second embodiments, the only styrene-butadiene copolymer rubber used in the elastomer component is a styrene-butadiene copolymer rubber functionalized with a silica-reactive functional group. In certain of the foregoing embodiments, the amount of styrene-butadiene copolymer rubber having a silica-reactive functional group is at least 20 phr (e.g., 20 phr, 30 phr, 40 phr, 50 phr, 60 phr, 70 phr, 80 phr, etc.), preferably 30-60 phr (e.g., 30 phr, 40 phr, 50 phr, or 60 phr). In other embodiments of the first and second embodiments, the elastomer component includes at least one styrene-butadiene rubber which is not functionalized; in certain such embodiments, the non-functionalized styrene-butadiene rubber is used in combination with a functionalized styrene-butadiene copolymer rubber, e.g., functionalized with a silica-reactive functional group. Non-limiting examples of silica-reactive functional groups generally include nitrogen-containing functional groups, silicon-containing functional groups, oxygen- or sulfur-containing functional groups, and metal-containing functional groups, as discussed in more detail below.

When a functionalized SBR is used in the elastomer component for certain embodiments of the first and second embodiments, the functionalization can be achieved by adding a functional group to one or both terminus of the polymer, by adding a functional group to the backbone of the poly (or a combination of the foregoing) or by coupling more than one polymer chains to a coupling agent, or by a combination thereof. Such effects can be achieved by treating a living polymer with coupling agents, functionalizing agents, or a combination thereof which serve to couple and/or functionalize other chains. In certain embodiments of the first and second embodiments, the functionalized SBR contains one or more functional groups but is not coupled (i.e., does not contain any coupling agents). Generally, a coupling agent and/or functionalizing agent can be used at various molar ratios. Alternatively, in certain embodiments of the first and second embodiments, the functionalized SBR may be silica-reactive merely from the result of using a coupling agent. Although reference is made herein to the use of both coupling agents and functionalizing groups (and compounds used therefor), those skilled in the art appreciate that certain compounds may serve both functions. That is, certain compounds may both couple and provide the polymer chains with a functional group. Those skilled in the art also appreciate that the ability to couple polymer chains may depend upon the amount of coupling agent reacted with the polymer chains. For example, advantageous coupling may be achieved where the coupling agent is added in a one to one ratio between the equivalents of lithium on the initiator and equivalents of leaving groups (e.g., halogen atoms) on the coupling agent. Non-limiting examples of coupling agents include metal halides, metalloid halides, alkoxysilanes, alkoxystannanes, and combinations thereof.

Non-limiting examples of nitrogen-containing functional groups that can be utilized in certain embodiments of the first and second embodiments as a silica-reactive functional group in the SBR include, but are not limited to, a substituted or unsubstituted amino group, an amide residue, an isocyanate group, an imidazolyl group, an indolyl group, an imino group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments of the first and second embodiments, the SBR of the elastomer component comprises at one silica-reactive functional group selected from the foregoing list of nitrogen-containing functional groups.

In certain embodiments of the first and second embodiments, the SBR includes a silica-reactive functional group from a compound which includes nitrogen in the form of an imino group. Such an imino-containing functional group may be added by reacting the active terminal of a polymer chain with a compound having the following formula (I):

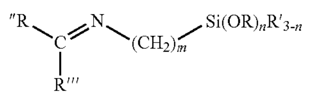

wherein R, R', R", and R'" each independently are selected from a group having 1 to 18 carbon atoms (e.g., 1, 2, 3, 4, 5, 6, 7, 8, 9, 10, 11, 12, 13, 14, 15, 16, 17, or 18 carbon atoms) selected from the group consisting of an alkyl group, an allyl group, and an aryl group; m and n are integers of 1 to 20 (e.g., 1, 2, 3, 4, 5, 6, 7, 8, 9, 10, 11, 12, 13, 14, 15, 16, 17, 18, 19, or 20) and 1 to 3 (1, 2, or 3), respectively. Each of R, R', R", and R'" are preferably hydrocarbyl and contain no heteroatoms. In certain embodiments of the first and second embodiments, each R and R' are independently selected from an alkyl group having 1 to 6 carbon atoms (e.g., 1, 2, 3, 4, 5, or 6 carbon atoms), preferably 1 to 3 carbon atoms (e.g., 1, 2, or 3 carbon atoms). In certain embodiments of the first and second embodiments, m is an integer of 2 to 6 (e.g., 2, 3, 4, 5, or 6), preferably 2 to 3. In certain embodiments of the first and second embodiments, R'" is selected from a group having 1 to 6 carbon atoms (e.g., 1, 2, 3, 4, 5, or 6 carbon atoms), preferably 2 to 4 carbon atoms (e.g., 2, 3, or 4 carbon atoms). In certain embodiments of the first and second embodiments, R" is selected from an alkyl group having 1 to 6 carbon atoms (e.g., 1, 2, 3, 4, 5, or 6 carbon atoms), preferably 1 to 3 carbon atoms (e.g., 1, 2, or 3 carbon atoms), most preferably 1 carbon atom (e.g., methyl). In certain embodiments of the first and second embodiments, n is 3 resulting in a compound with a trihydrocarboxysilane moiety such as a trialkoxysilane moiety. Non-limiting examples of compounds having an imino group and meeting formula (I) above, which are suitable for providing the silica-reactive functional group for the SBR include, but are not limited to, N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, and N-(4-N,N-dimethylaminobenzylidene)-3-(triethoxysilyl)-1-propaneamine.

Non-limiting examples of silicon-containing functional groups that can be utilized in certain embodiments of the first and second embodiments as a silica-reactive functional group in the SBR include, but are not limited to, an organic silyl or siloxy group, and more precisely, such a functional group may be selected from an alkoxysilyl group, an alkylhalosilyl group, a siloxy group, an alkylaminosilyl group, and an alkoxyhalosilyl group. Optionally, the organic silyl or siloxy group may also contain one or more nitrogens. Suitable silicon-containing functional groups for use in functionalizing diene-based elastomers also include those disclosed in U.S. Pat. No. 6,369,167, the entire disclosure of which is herein incorporated by reference. In certain embodiments of the first and second embodiments, the SBR comprises at least one silica-reactive functional group selected from the foregoing list of silicon-containing functional groups.

In certain embodiments of the first and second embodiments, the SBR includes a silica-reactive functional group which includes a silicon-containing functional group having a siloxy group (e.g., a hydrocarbyloxysilane-containing compound), wherein the compound optionally includes a monovalent group having at least one functional group. Such a silicon-containing functional group may be added by reacting the active terminal of a polymer chain with a compound having the following formula (II):

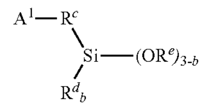

wherein $A^1$ represents a monovalent group having at least one functional group selected from epoxy, isocyanate, imine, cyano, carboxylic ester, carboxylic anhydride, cyclic tertiary amine, non-cyclic tertiary amine, pyridine, silazane and sulfide; $R^c$ represents a single bond or a divalent hydrocarbon group having from 1 to 20 carbon atoms (e.g., 1, 2, 3, 4, 5, 6, 7, 8, 9, 10, 11, 12, 13, 14, 15, 16, 17, 18, 19, or 20 carbon atoms); $R^d$ represents a monovalent aliphatic hydrocarbon group having 1 to 20 carbon atoms (e.g., 1, 2, 3, 4, 5, 6, 7, 8, 9, 10, 11, 12, 13, 14, 15, 16, 17, 18, 19, or 20 carbon atoms), a monovalent aromatic hydrocarbon group having 6 to 18 carbon atoms (e.g., 6, 7, 8, 9, 10, 11, 12, 13, 14, 15, 16, 17, or 18 carbon atoms) or a reactive group; $R^e$ represents a monovalent aliphatic hydrocarbon group having 1 to 20 carbon atoms (e.g., 1, 2, 3, 4, 5, 6, 7, 8, 9, 10, 11, 12, 13, 14, 15, 16, 17, 18, 19, or 20 carbon atoms) or a monovalent aromatic hydrocarbon group having 6 to 18 carbon atoms (e.g., 6, 7, 8, 9, 10, 11, 12, 13, 14, 15, 16, 17, or 18 carbon atoms); b is an integer of 0 to 2; when more than one $R^d$ or $OR^e$ are present, each $R^d$ and/or $OR^e$ may be the same as or different from each other; and an active proton is not contained in a molecule) and/or a partial condensation product thereof. As used herein, a partial condensation product refers to a product in which a part (not all) of a SiOR group in the hydrocarbyloxysilane compound is turned into a SiOSi bond by condensation. In certain embodiments of the first and second embodiments, at least one of the following is met: (a) $R^c$ represents a divalent hydrocarbon group having 1 to 12 carbon atoms (e.g., 1, 2, 3, 4, 5, 6, 7, 8, 9, 10, 11, or 12 carbon atoms), 2 to 6 carbon atoms (e.g., 2, 3, 4, 5, or 6 carbon atoms), or 2 to 3 carbon atoms (e.g., 2 or 3 carbon atoms); (b) $R^e$ represents a monovalent aliphatic hydrocarbon group having 1 to 12 carbon atoms (e.g., 1, 2, 3, 4, 5, 6, 7, 8, 9, 10, 11, or 12 carbon atoms), 2 to 6 carbon atoms (e.g., 2, 3, 4, 5, or 6 carbon atoms), or 1 to 2 carbon atoms or a monovalent aromatic hydrocarbon group having 6 to 8 carbon atoms; (c) $R^d$ represents a monovalent aliphatic hydrocarbon group having 1 to 12 carbon atoms (e.g., 1, 2, 3, 4, 5, 6, 7, 8, 9, 10, 11, or 12 carbon atoms), 2 to 6 carbon atoms (e.g., 2, 3, 4, 5, or 6 carbon atoms), or 1 to 2 carbon atoms or a monovalent aromatic hydrocarbon group having 6 to 8 carbon atoms; in certain such embodiments, each of (a), (b) and (c) are met and $R^c$, $R^e$ and $R^d$ are selected from one of the foregoing groups.

In certain embodiments of the first and second embodiments, the functional group of the SBR results from a compound represented by Formula (II) wherein $A^1$ has at least one epoxy group. Non-limiting specific examples of such compounds include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)-methyldimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl) dimethoxysilane and the like. Among them, 3-glycidoxypropyltrimethoxysilane and 2-(3,4-epoxycyclohexyl)ethyltrimethoxysilane are particularly suited.

In certain embodiments of the first and second embodiments, the functional group of the SBR results from a compound represented by Formula (II) wherein $A^1$ has at least one isocyanate group. Non-limiting specific examples of such compounds include 3-isocyanatopropyltrimethoxysilane, 3-isocyanatopropyltriethoxysilane, 3-isocyanatopropylmethyldiethoxysilane, 3-isocyanatopropyltriisopropoxysilane and the like, and among them, 3-isocyanatopropyltrimethoxysilane is particularly preferred.

In certain embodiments of the first and second embodiments, the functional group of the SBR results from a compound represented by Formula (II) wherein $A^1$ has at least one imine group. Non-limiting specific examples of such compounds include N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine and trimethoxysilyl compounds, methyldiethoxysilyl compounds, ethyldimethoxysilyl compounds and the like each corresponding to the above triethoxysilyl compounds. Among them, N-(1,3-dimethylbutylidene)-3-(triethoxysilyl)-1-propaneamine and N-(1-methylpropylidene)-3-(triethoxysilyl)-1-propaneamine are particularly suited. Also, the imine(amidine) group-containing compounds include preferably 1-[3-trimethoxysilyl]propyl]-4,5-dihydroimidazole, 3-(1-hexamethyleneimino)propyl(triethoxy)silane, (1-hexamethyleneimino)methyl (trimethoxy)silane, N-(3-triethoxysilylpropyl)-4,5-dihydroimidazole, N-(3-isopropoxysilylpropyl)-4,5-dihydroimidazole, N-(3-methyldiethoxysilylpropyl)-4,5-dihydroimidazole and the like, and among them, N-(3-triethoxysilylpropyl)-4,5-dihydroimidazole and N-(3-isopropoxysilylpropyl)-4,5-dihydroimidazole are preferred.

In certain embodiments of the first and second embodiments, the functional group of the SBR results from a compound represented by Formula (II) wherein $A^1$ has at least one carboxylic ester group. Non-limiting specific examples of such compounds include 3-methacryloyloxypropyltriethoxysilane, 3-methacryloyloxypropyltrimethoxysilane, 3-methacryloyloxypropylmethyldiethoxysilane, 3-methacryloyloxypropyltriisopropoxysilane and the like, and among them, 3-methacryloyloxypropyltriethoxysilane is preferred.

In certain embodiments of the first and second embodiments, the functional group of the SBR results from a compound represented by Formula (II) wherein $A^1$ has at least one carboxylic anhydride group. Non-limiting specific examples of such compounds include 3-trimethoxysilylpropylsuccinic anhydride, 3-triethoxysilylpropylsuccinic anhydride, 3-methyldiethoxysilylpropylsuccinic anhydride and the like, and among them, 3-triethoxysilylpropylsuccinic anhydride is preferred.

In certain embodiments of the first and second embodiments, the functional group of the SBR results from a compound represented by Formula (II) wherein $A^1$ has at least one cyano group. Non-limiting specific examples of such compounds include 2-cyanoethylpropyltriethoxysilane and the like.

In certain embodiments of the first and second embodiments, the functional group of the SBR results from a compound represented by Formula (II) wherein $A^1$ has at least one cyclic tertiary amine group. Non-limiting specific examples of such compounds include 3-(1-hexamethyleneimino)propyltriethoxysilane, 3-(1-hexamethyleneimino) propyltrimethoxysilane, (1-hexamethyleneimino)methyltriethoxysilane, (1-hexamethyleneimino) methyltrimethoxysilane, 2-(1-hexamethyleneimino) ethyltriethoxysilane, 3-(1-hexamethyleneimino) ethyltrimethoxysilane, 3-(1-pyrrolidinyl) propyltrimethoxysilane, 3-(1-pyrrolidinyl)

propyltriethoxysilane, 3-(1-heptamethyleneimino)propyltriethoxysilane, 3-(1-dodecamethyleneimino)propyltriethoxysilane, 3-(1-hexamethyleneimino)propyldiethoxymethylsilane, 3-(1-hexamethyleneimino)propyldiethoxyethylsilane, 3-[10-(triethoxysilyl)decyl]-4-oxazoline and the like. Among them, 3-(1-hexamethyleneimino)propyltriethoxysilane and (1-hexamethyleneimino)methyltriethoxysilane can preferably be listed.

In certain embodiments of the first and second embodiments, the functional group of the SBR results from a compound represented by Formula (II) wherein $A^1$ has at least one non-cyclic tertiary amine group. Non-limiting specific examples of such compounds include 3-dimethylaminopropyltriethoxysilane, 3-dimethylaminopropyltrimethoxysilane, 3-diethylaminopropyltriethoxysilane, 3-dimethylaminopropyltrimethoxysilane, 2-dimethylaminoethyltriethoxysilane, 2-dimethylaminoethyltrimethoxysilane, 3-dimethylaminopropyldiethoxymethylsilane, 3-dibutylaminopropyltriethoxysilane and the like, and among them, 3-dimethylaminopropyltriethoxysilane and 3-diethylaminopropyltriethoxysilane are suited.

In certain embodiments of the first and second embodiments, the functional group of the SBR results from a compound represented by Formula (II) wherein $A^1$ has at least one pyridine group. Non-limiting specific examples of such compounds include 2-trimethoxysilylethylpyridine and the like.

In certain preferred embodiments of the first and second embodiments, the functional group of the SBR results from a compound represented by Formula (II) wherein $A^1$ has at least one silazane group. Non-limiting specific examples of such compounds include N,N-bis(trimethylsilyl)-aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl) aminopropyltriethoxysilane, N,N-bis(trimethylsilyl) aminopropylmethyldiethoxysilane, N,N-bis(trimethylsilyl) aminoethyltrimethoxysilane, N,N-bis(trimethylsilyl) aminoethyltriethoxysilane, N,N-bis(trimethylsilyl) aminoethylmethyldimethoxysilane, N,N-bis(trimethylsilyl) aminoethylmethyldiethoxysilane and the like. N,N-bis (trimethylsilyl)aminopropyltriethoxysilane, N,N-bis (trimethylsilyl)aminopropylmethyldiethoxysilane or 1-trimethylsilyl-2,2-dimethoxy-1-aza-2-silacyclopentane are particularly preferred.

In those embodiments of the first and second embodiments wherein a silica-reactive functional group according to formula (II) is used wherein $A^1$ contains one or more protected nitrogens (as discussed in detail above), the nitrogen(s) may be deprotected or deblocked by hydrolysis or other procedures to convert the protected nitrogen(s) into a primary nitrogen. As a non-limiting example, a nitrogen bonded to two trimethylsilyl groups could be deprotected and converted to a primary amine nitrogen (such a nitrogen would still be bonded to the remainder of the formula (II) compound). Accordingly, in certain embodiments of the first and second embodiments wherein a silica-reactive functional group of the SBR results from use of a compound according to formula (II) wherein $A^1$ contains one or more protected nitrogens, the functionalized polymer can be understood as containing a functional group resulting from a deprotected (or hydrolyzed) version of the compound.

Non-limiting examples of oxygen- or sulfur-containing functional groups that can be utilized in certain embodiments of the first and second embodiments as a silica-reactive functional group in the SBR include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group, and a thioketone group. In certain embodiments of the first and second embodiments, the foregoing alkoxy group may be an alcohol-derived alkoxy group derived from a benzophenone. In certain embodiments of the first and second embodiments, the SBR comprises at least silica-reactive functional group selected from the foregoing list of oxygen- or sulfur-containing functional groups.

According to the first and second embodiments, the one or more SBRs including SBRs having a silica-reactive functional group may be prepared by either solution polymerization or by emulsion polymerization. In certain preferred embodiments of the first and second embodiments, the only SBR or SBR having a silica-reactive functional group is prepared by solution polymerization. In other embodiments of the first and second embodiments, the only SBR or SBR having a silica-reactive functional group is prepared by emulsion polymerization. In certain embodiments of the first and second embodiments, when more than one SBR or SBR having a silica-reactive functional group is used, the rubbers are a combination of solution polymerized SBR and emulsion polymerized SBR (e.g., one solution SBR and one emulsion SBR). In certain embodiments of the first and second embodiments, the only SBR(s) present in the elastomer component (including for the SBR having a silica-reactive functional group) is a solution SBR (i.e., no emulsion SBR is present).

In one or more embodiments of the first and second embodiments, the coupling agent for the SBR comprises a metal halide or metalloid halide selected from the group comprising compounds expressed by the formula (1) $R^*_n M^1 Y_{(4-n)}$, the formula (2) $M^1Y_4$, and the formula (3) $M^2Y_3$, where each R* is independently a monovalent organic group having 1 to 20 carbon atoms, $M^1$ is a tin atom, silicon atom, or germanium atom, $M^2$ is a phosphorous atom, Y is a halogen atom, and n is an integer of 0-3.

Exemplary compounds expressed by the formula (1) include halogenated organic metal compounds, and the compounds expressed by the formulas (2) and (3) include halogenated metal compounds.

In the case where $M^1$ represents a tin atom, the compounds expressed by the formula (1) can be, for example, triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride and the like. Furthermore, tin tetrachloride, tin tetrabromide and the like can be exemplified as the compounds expressed by formula (2).

In the case where $M^1$ represents a silicon atom, the compounds expressed by the formula (1) can be, for example, triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like. Furthermore, silicon tetrachloride, silicon tetrabromide and the like can be exemplified as the compounds expressed by the formula (2). In the case where $M^1$ represents a germanium atom, the compounds expressed by the formula (1) can be, for example, triphenylgermanium chloride, dibutylgermanium dichloride, diphenylgermanium dichloride, butylgermanium trichloride and the like. Furthermore, germanium tetrachloride, germanium tetrabromide and the like can be exemplified as the compounds expressed by the formula (2). Phosphorous trichloride, phosphorous tribromide and the like can be exemplified as the compounds expressed by the formula (3). In one or more embodiments, mixtures of metal halides and/or metalloid halides can be used.

In one or more embodiments of the first and second embodiments, the coupling agent for the SBR comprises an alkoxysilane or alkoxystannane selected from the group comprising compounds expressed by the formula (4) $R^{*}_{n}M^{1}(OR^{\wedge})_{4-n}$, where each R* is independently a monovalent organic group having 1 to 20 carbon atoms, $M^1$ is a tin atom, silicon atom, or germanium atom, OR^ is an alkoxy group where R^ is a monovalent organic group, and n is an integer of 0-3.

Exemplary compounds expressed by the formula (4) include tetraethyl orthosilicate, tetramethyl orthosilicate, tetrapropyl orthosilicate, tetraethoxy tin, tetramethoxy tin, and tetrapropoxy tin.

According to the first and second embodiments disclosed herein, when at least one SBR is present in the elastomer component), the Mw, Mn and polydispersity (Mw/Mn) of the styrene-butadiene rubber(s) may vary. In certain embodiments of the first and second embodiments, the SBR(s) have a Mw of 300,000 to 600,000 grams/mole (e.g., 300,000; 325,000; 350,000; 375,000; 400,000; 425,000; 450,000; 475,000; 500,000; 525,000; 550,000; 575,000; or 600,000 grams/mole). In certain embodiments of the first and second embodiments, the SBR(s) have a Mw of 350,000 to 550,000, or 400,000 to 500,000 grams/mole. The Mw values referred to herein are weight average molecular weights which can be determined by using gel permeation chromatography (GPC) calibrated with styrene-butadiene standards and Mark-Houwink constants for the polymer in question. In certain embodiments of the first and second embodiments, the SBR(s) have a Mn of 200,000 to 400,000 grams/mole (e.g., 200,000; 225,000; 250,000; 275,000; 300,000; 325,000; 350,000; 375,000; or 400,000 grams/mole). In certain embodiments of the first and second embodiments, the SBR(s) have a Mn of 200,000 to 300,000. The Mn values referred to herein are number average molecular weights which can be determined by using gel permeation chromatography (GPC) calibrated with styrene-butadiene standards and Mark-Houwink constants for the polymer in question. In certain embodiments of the first and second embodiments disclosed herein, the SBR(s) have a Mw/Mn (polydispersity) of 1.2 to 2.5 to (e.g., 1.2, 1.3, 1.4, 1.5, 1.6, 1.7, 1.8, 1.9, 2, 2.1, 2.2, 2.3, 2.4, or 2.5, preferably 1.3 to 2. In certain embodiments of the first and second embodiments, the SBR(s) have a Mw, Mn and Mw/Mn all falling within one of the foregoing ranges; in certain such embodiments, each of the Mw, Mn and Mw/Mn fall within one of the foregoing preferred ranges. In other embodiments of the first and second embodiments, the SBR(s) utilized either (a) include at least one of the foregoing SBRs having a Mw, Mn, and/or Mn/Mn falling within one of the foregoing ranges in combination with an SBR having a Mw of 350,000 to 600,000 grams/mole (e.g., 350,000; 400,000; 450,000; 500,000; 550,000; or 600,000 grams/mole) or 400,000 to 550,000 grams/mole (e.g., 400,000; 425,000; 450,000; 475,000; 500,000; 525,000; or 550,000 grams/mole), (b) or only include one or more SBRs having a Mw of 350,000 to 600,000 grams/mole (e.g., 350,000; 400,000; 450,000; 500,000; 550,000; or 600,000 grams/mole) or 400,000 to 550,000 grams/mole (e.g., 400,000; 425,000; 450,000; 475,000; 500,000; 525,000; or 550,000 grams/mole).

According to the first and second embodiments, the Tg of any SBR used in the elastomer component may vary. In certain preferred embodiments of the first and second embodiments, the SBR(s) have a Tg of about −75 to about −50° C., −75 to −50° C. (e.g., −75, −70, −65, −60, −55, or −50° C.), preferably −70 to −55° C. (e.g., −70, −65, −60, or −55° C.), or more preferably −65 to −55° C. (e.g., −65, −60, or −55° C.). In other embodiments of the first and second embodiments, the SBR(s) utilized include a SBR having a Tg of about −10 to about −70° C., −10 to −70° C. (e.g., −10, −15, −20, −25, −30, −35, −40, −45, −50, −55, −60, −65, or −70° C.), preferably about −10 to about −49° C. or −10 to −49° C. (e.g., −10, −12, −14, −15, −16, −18, −20, −22, −24, −26, −28, −30, −32, −34, −36, −35, −38, −40, −42, −44, −45, −46, −48, or −49° C.). The SBR(s) may have a Tg within one of the foregoing ranges, optionally in combination with one or more of the Mw, Mn, and/or Mw/Mn ranges discussed above, and in certain embodiments optionally in combination with one of the styrene monomer contents discussed below. The Tg values referred to herein for elastomers represent a Tg measurement made upon the elastomer without any oil-extension. In other words, for an oil-extended elastomer, the Tg values above refer to the Tg prior to oil extension or to a non-oil-extended version of the same elastomer. Elastomer or polymer Tg values may be measured using a differential scanning calorimeter (DSC) instrument, such as manufactured by TA Instruments (New Castle, Delaware), where the measurement is conducted using a temperature elevation of 10° C./minute after cooling at −120° C. Thereafter, a tangent is drawn to the base lines before and after the jump of the DSC curve. The temperature on the DSC curve (read at the point corresponding to the middle of the two contact points) can be used as Tg.

According to the first and second embodiments, the styrene monomer content (i.e., weight percent of the polymer chain comprising styrene units as opposed to butadiene units) of any SBR(s) used in the elastomer component may vary. In certain embodiments of the first and second embodiments, the SBR(s) have a styrene monomer content of about 10 to about 40 weight %, 10-40 weight % (e.g., 10%, 15%, 20%, 25%, 30%, 35%, or 40%), 10-30 weight % (e.g., 10%, 15%, 20%, 25%, or 30%), or 10-20 weight % (e.g., 10%, 12%, 14%, 16%, 18%, or 20%). In certain embodiments of the first and second embodiments, the SBR(s) may have a styrene monomer content within one of the foregoing ranges, optionally in combination with one or more of the Mw, Mn, and/or Mw/Mn ranges discussed below, and in certain embodiments optionally in combination with one of the Tg ranges discussed above and/or vinyl bond contents discussed below.

According to the first and second embodiments, the vinyl bond content (i.e., 1,2-microstructure) of any SBR(s) used in the elastomer component may vary. In certain embodiments of the first and second embodiments, the SBR has a vinyl bond content of about 10 to about 50%, 10-50% (e.g., 10%, 15%, 20%, 25%, 30%, 35%, 40%, 45%, or 50%), about 10 to about 40%, 10-40% (e.g., 10%, 15%, 20%, 25%, 30%, 35%, or 40%), about 20 to about 40%, or 20-40% (e.g., 20%, 25%, 30%, 35%, or 40%). In certain embodiments of the first and second embodiments, the SBR(s) may have a vinyl bond content within one of the foregoing ranges, optionally in combination with one or more of the Mw, Mn, Mw/Mn, Tg, and/or styrene monomer content ranges discussed above. The vinyl bond contents referred to herein should be understood as being for the overall vinyl bond content in the SBR polymer chain rather than of the vinyl bond content in the butadiene portion of the SBR polymer chain, and can be determined by $H^1$-NMR and $C^{13}$-NMR (e.g., using a 300 MHz Gemini 300 NMR Spectrometer System (Varian)).

As mentioned above, according to the third embodiment, the average Tg of the elastomer component is about −60 to about −90° C. In certain embodiments of the first, second and fourth embodiments, the average Tg of the elastomer component is about −60 to about −90° C., −60 to −90° C. (e.g., −60, −61, −62, −63, −64, −65, −66, −67, −68, −69, −70, −71, −72, −73, −74, −75, −76, −77, −78, −79, −80, −81, −82, −83, −84, −85, −86, −87, −88, −89, or −90° C.). In certain embodiments of the first-fourth embodiments, the average Tg of the elastomer component is about −70 to about −90° C., or −70 to −90° C. (e.g., −70, −71, −72, −73, −74, −75, −76, −77, −78, −79, −80, −81, −82, −83, −84, −85, −86, −87, −88, −89, or −90° C.). In certain embodiments of the first-fourth embodiments, the average Tg of the elastomer component is about −75 to about −90° C., or −75 to −90° C. (e.g., −75, −76, −77, −78, −79, −80, −81, −82, −83, −84, −85, −86, −87, −88, −89, or −90° C.). In certain embodiments of the first-fourth embodiments, the average Tg of the elastomer component is about −80 to about −85° C., or −80 to −85° C. (e.g., −80, −81, −82, −83, −84, or −85° C.). The average Tg of the elastomer component can be calculated using the Tg of each rubber present in the 100 parts of elastomer component and accounting for their relative weight percentage. When one (or more) of the rubbers is oil-extended, only the amount of rubber (i.e., excluding any amount of oil) is utilized in calculating the average Tg of the elastomer component. When one (or more) of the rubbers is oil-extended, the Tg of non-oil extended rubber is utilized in calculating the average Tg of the elastomer component.

Polybutadiene

According to the first and second embodiments, the elastomer component of the rubber composition for the tire tread may include polybutadiene rubber. The particular type of polybutadiene rubber utilized may vary. Preferably, according to the first and second embodiments, any polybutadiene rubber present in the elastomer component has a cis bond content of at least 95% (e.g., 95%, 96%, 97%, 98%, 99%, or more) and a Tg of less than −101° C. (e.g., −102, −103, −104, −105, −106, −107, −108, −109° C. or less). In certain such embodiments, the Tg of the polybutadiene rubber is −101 to −110° C. The cis bond content refers to the cis 1,4-bond content. The cis 1,4-bond contents referred to herein are determined by FTIR (Fourier Transform Infrared Spectroscopy) wherein a polymer sample is dissolved in $CS_2$ and then subjected to FTIR. In certain embodiments of the first and second embodiments, the polybutadiene rubber present in the elastomer component may have a cis 1,4-bond content of at least 98% (e.g., 98%, 99%, or more) or at least 99% (e.g., 99%, 99.5%, or more). In certain embodiments of the first and second embodiments, any polybutadiene rubber present in the elastomer component has a Tg of −105° C. or less (e.g., −105, −106, −107, −108, −109° C. or less) such as −105 to −110° C. or −105 to −108° C. In certain embodiments of the first and second embodiments, any polybutadiene rubber present in the elastomer component contains less than 3% by weight (e.g., 3%, 2%, 1%, 0.5%, or less), preferably less than 1% by weight (e.g., 1%, 0.5%, or less) or 0% by weight syndiotactic 1,2-polybutadiene. Generally, according to the first and second embodiments, one or more than one polybutadiene rubber having a cis bond content of at least 95% and a Tg of less than −101° C. may be used in the elastomer component. In certain embodiments of the first-third embodiments, the only polybutadiene rubber used has a cis bond content of at least 95% (e.g., 95%, 96%, 97%, 98%, 99%, or more) and a Tg of less than −101° C. In preferred embodiments of the first and second embodiments, the amount of any polybutadiene rubber having a high vinyl content (i.e., above about 70%) that is used in the elastomer component is limited to less than 25 parts, more preferably less than 10 parts, even more preferably less than 5 parts or 0 parts.

According to the first and second embodiments, when a polybutadiene rubber is used in the rubber composition, the amount utilized may vary. In certain embodiments of the first and second embodiments, the total amount of any polybutadiene rubber present in the elastomer component will be a minority by weight, or less than 50% by weight. In such embodiments of the first and second embodiments, the total amount of polybutadiene rubber present in the elastomer component is less than 50 phr, less than 40 phr, less than 30 phr, less than 20 phr, or less than 10 phr. In certain embodiments of the first and second embodiments, the total amount of polybutadiene rubber present in the elastomer component is 5-49 phr, 5-40 phr, 5-30 phr, 5-20 phr, 5-10 phr, 10-49 phr, 10-40 phr, 10-30 phr, 10-20 phr, 20-49 phr, 20-40 phr, or 20-30 phr. In other embodiments of the first and second embodiments, the total amount of any polybutadiene rubber present in the elastomer component is a majority by weight, or more than 50% by weight. In such embodiments of the first and second embodiments, the total amount of polybutadiene rubber present in the elastomer component is 51 phr or more, 60 phr or more, 70 phr, or more, 75 phr or more, 80 phr or more, 85 phr or more, 51-85 phr, 51-80 phr, 51-75 phr, 51-70 phr, 60-85 phr, 60-80 phr, 60-75 phr, or 60-70 phr.

Natural Rubber or Polyisoprene

According to the first and second embodiments, the elastomer component may include natural rubber, polyisoprene, or a combination thereof. In certain embodiments of the first and second embodiment, the elastomer component includes natural rubber, but not polyisoprene. In other embodiments of the first and second embodiments, the elastomer component includes only polyisoprene, but not natural rubber. According to the first and second embodiments, when natural rubber is present in the elastomer component, it may include Hevea natural rubber, non-Hevea natural rubber (e.g., guayule natural rubber), or a combination thereof. When natural rubber is used in the rubber composition of the first and second embodiments, the natural rubber preferably has a Mw of 1,000,000 to 2,000,000 grams/mole (e.g., 1 million, 1.1 million, 1.2 million, 1.3 million, 1.4 million, 1.5 million, 1.6 million, 1.7 million, 1.8 million, 1.9 million, 2 million grams/mole); 1,250,000 to 2,000,000 grams/mole, or 1,500,000 to 2,000,000 grams/mole (as measured by GPC using a polystyrene standard). When natural rubber is used in the rubber compositions of the first and second embodiments, the Tg of the natural rubber may vary. Preferably, according to the first and second embodiments, when natural rubber is utilized it has a Tg of −65 to −80° C. (e.g., −65, −66, −67, −68, −69, −70, −71-, −72, −73, −74, −75, −76, −77, −78, −79, or −80° C.), more preferably a Tg of −67 to −77° C. (e.g., −67, −68, −69, −70, −71, −72, −73, −74, −75, −76, or −77° C.). When polyisoprene is utilized in the rubber compositions of the first and second embodiments, the Tg of the polyisoprene may vary. Preferably, according to the first and second embodiments, when polyisoprene is utilized it has a Tg of −55 to −75° C. (e.g., −55, −56, −57, −58, −59, −60, −61, −62, −63, −64, −65, −66, −67, −68, −69, −70, −71, −72, −73, −74, or −75° C.), more preferably −58 to −74° C. (e.g., −58, −59, −60, −61, −62, −63, −64, −65, −66, −67, −68, −69, −70, −71, −72, −73, or −74° C.).

According to the first and second embodiments, when natural rubber and/or polyisoprene are used in the rubber composition, the amount utilized may vary. Generally, according to the first and second embodiments, the total amount of any natural rubber and/or polyisoprene present in the elastomer component will be a minority by weight, or less than 50% by weight. In certain embodiments of the first and second embodiments, the total amount of natural rubber and/or polyisoprene present in the elastomer component is less than 50 phr, less than 40 phr, less than 30 phr, less than 20 phr, or less than 10 phr. In certain embodiments of the first and second embodiments, the total amount of natural rubber and/or polyisoprene present in the elastomer component is 5-49 phr, 5-40 phr, 5-30 phr, 5-20 phr, 5-10 phr, 10-49 phr, 10-40 phr, 10-30 phr, 10-20 phr, 20-49 phr, 20-40 phr, or 20-30 phr. In embodiments of the first and second embodiments, the elastomer component includes natural rubber but no polyisoprene, and the amount of natural rubber is within one of the foregoing ranges.

Resin Component

As mentioned above, according to the first and second embodiments, the rubber composition for the tire tread includes 20 to 60 phr (e.g., 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 phr) of a resin component which includes (i) a terpene phenol resin having a hydroxyl value of 80 or more (e.g., 80, 85, 90, 95, 100, 105, 110, 115, 120, 125, 130, 135, 140, 145, 150, 155, 160, 165, or more), preferably a hydroxyl value of 90 or more (e.g., 90, 95, 100, 105, 110, 115, 120, 125, 130, 135, 140, 145, 150, 155, 160, 165, or more), more preferably a hydroxyl value of 100 or more (e.g., 100, 105, 110, 115, 120, 125, 130, 135, 140, 145, 150, 155, 160, 165, or more), and (ii) a DCPD-based resin, wherein the terpene phenol resin (i) comprises a majority by weight of the resin component. In certain embodiments of the first and second embodiments, the resin component comprises at least 51% by weight (e.g., 51%, 55%, 60%, 65%, 70%, 75%, 80% by weight, or more) of the terpene phenol resin (i). In certain embodiments of the first and second embodiments, the resin component comprises 20 to 50 phr, 20 to 45 phr, 20 to 40 phr, 20 to 35 phr, 20 to 30 phr, 25 to 55 phr, 25 to 50 phr, 25 to 45 phr, 25 to 40 phr, or 25 to 35 phr, in total of the terpene phenol resin (i) and DCPD-based resin (ii). In preferred embodiments of the first and second embodiments, the amount of any hydrocarbon resin other than the terpene phenol resin (i) and the DCPD-based resin (ii), each as described above, is limited. In certain embodiments of the first and second embodiments, the amount of any other hydrocarbon resin (i.e., other than the terpene phenol resin (i) and the DCPD-based resin (ii)) is no more than 10 phr (e.g., 10, 9, 8, 7, 6, 5, 4, 3, 2, 1, or 0 phr or a range falling within such as 10-0 phr, 10-1 phr, 10-2 phr, etc.), preferably no more than 5 phr (e.g., 5, 4, 3, 2, 1, or 0 phr or a range falling within such as 5-0 phr, 5-1 phr, 5-2 phr, etc.) or even 0 phr. In certain embodiments of the first and second embodiments, the terpene phenol resin (i) has a hydroxyl value of 80-165, 90-165, 100-165, 80-155, 90-155, 100-155, 80-150, 90-150, 100-150, 80-140, 90-140, or 100-140 and is used in one of the foregoing amounts.

Terpene Phenol Resin

According to the first and second embodiments, one or more than one terpene phenol resin having a relatively high hydroxyl value, as discussed above, may be used in the rubber composition. In certain embodiments of the first and second embodiments, only one such terpene phenol resin is present. In other embodiments, two or more such terpene phenol resins are present. Other than the hydroxyl value, which is discussed above, the other properties of the terpene phenol resin (i) may vary. In certain embodiments of the first and second embodiments, the terpene phenol resin (i) has a Tg of 50 to 110° C. (e.g., 50, 55, 60, 65, 70, 75, 80, 85, 90, 95, 100, 105 or 110° C., preferably 60 to 80° C. (e.g., 62, 64, 66, 68, 70, 72, 74, 76, 78, or 80° C.). In certain embodiments of the first and second embodiments, the terpene phenol resin (i) has a softening point of 100 to 160° C. (e.g., 100, 105, 110, 115, 120, 125, 130, 135, 140, 145, 150, 155, or 160° C.), preferably 110 to 140° C. (e.g., 110, 112, 114, 116, 118, 120, 122, 124, 126, 128, 130, 132, 134, 136, 138 or 140° C.). The hydroxyl value of the terpene phenol resin (i) can be determined according to ASTM E222-17 using an instrument such as an 848 Titrino Plus from Metrohm. The Tg of the terpene phenol resin can be determined by using a differential scanning calorimeter (DSC) instrument, such as manufactured by TA Instruments (New Castle, Delaware), where the measurement is conducted using a temperature elevation of 10° C./minute after cooling at −120° C. Thereafter, a tangent is drawn to the base lines before and after the jump of the DSC curve. The temperature on the DSC curve (read at the point corresponding to the middle of the two contact points) can be used as Tg. The softening point of the terpene phenol resin (i) can be determined by ASTM E28-18 (a ring and ball method). In certain embodiments of the first and second embodiments, the terpene phenol resin not only has a hydroxyl value within one of the foregoing ranges but also a Tg within one of the foregoing ranges. In certain embodiments of the first and second embodiments, the terpene phenol resin (i) not only has a hydroxyl value within one of the foregoing ranges but also a softening point within one of the foregoing ranges. In certain embodiments of the first and second embodiments, the terpene phenol resin (i) not only has a hydroxyl value within one of the foregoing ranges but also a Tg and a softening point within one of the foregoing respective ranges. In certain embodiments of the first and second embodiments, the terpene phenol resin (i) not only has a hydroxyl value within one of the foregoing preferred ranges but also a Tg within one of the foregoing preferred ranges. In certain embodiments of the first and second embodiments, the terpene phenol resin (i) not only has a hydroxyl value within one of the foregoing preferred ranges but also a softening point within the foregoing range. In certain embodiments of the first and second embodiments, the terpene phenol resin (i) not only has a hydroxyl value within one of the foregoing preferred ranges but also a Tg and a softening point within one of the foregoing respective preferred ranges.

According to the first and second embodiments, the Mw and Mn of the terpene phenol resin (i) may vary. In certain embodiments of the first and second embodiments, the terpene phenol resin (i) has a Mw of 500 to 900 grams/mole, preferably 600 to 800 grams/mole. In certain embodiments of the first and second embodiments, the terpene phenol resin has a Mn of 400 to 800 grams/mole, preferably 500 to 700 grams/mole. In certain embodiments of the first and second embodiments, the terpene phenol resin (i) has a Mw and Mn within one of the foregoing respective ranges. In certain embodiments of the first and second embodiments, the terpene phenol resin (i) has a Mw and Mn within the foregoing respective preferred ranges.

According to the first and second embodiments, the particular monomers which comprise the terpene phenol resin (i) may vary but will generally include at least one terpene and at least one phenolic compound. Generally, terpenes are compounds derived from isoprene units and have a basic formula of (C5H8)n with n being the number of linked isoprene units. According to the first and second embodiments, the terpene monomer portion of the terpene phenol resin (i) may be selected from the group consisting of alpha-pinene, beta-pinene, D-limonene, dipentene (racemic limonene), careen (also known as delta-3-carene), beta-phellandrene, and combinations thereof. According to the first and second embodiments, the phenol monomer portion of the terpene phenol resin (i) may be selected from the group consisting of phenol, alkylphenols, bisphenol A, cresol, xylenol, and combinations thereof. Generally, according to the first and second embodiments, the terpene phenol resin (i) will comprise a majority by weight of terpene monomer(s). In certain embodiments of the first and second embodiments, the terpene monomer portion of the terpene phenol resin is 60-95%, 70-95%, or 60-85% by weight of the overall terpene phenol resin and the phenol monomer portion is 5 to 40%, 5-30%, or 15-40% by weight of the overall terpene phenol resin.

Terpene phenol resins suitable for use in the first and second embodiments are commercially available from various suppliers. As non-limiting examples, tepene phenol resins for use in the first and second embodiments are available from Pinova (under the tradename Dertophene® such as H150 and 1510), from Yasuhara Chemical (under the tradename Polyster® such as 5145), and from Kraton (under the tradenames Sylvares and Sylvatraxx such as TP2040 and TP300).

DCPD-Based Resin

As mentioned above, according to the first and second embodiments, the resin component of the rubber composition for the tread also includes a DCPD-based resin (ii). DCPD refers to dicyclopentadiene. Generally, the DCPD-based resin may be a DCPD homopolymer resin or a DCPD copolymer resin. By the phrase DCPD-based is meant that the resin contains a proportion of DCPD as monomer, more specifically at least 15% by weight (e.g., 15, 25, 30, 35, 40, 45, 50, 55, 60, 65, 70, 75%, etc.), at least 20% by weight (e.g., 30%, 40%, 50%, 60%, 70%, 80%, 90%, 95%, or 100% by weight), at least 25% by weight (e.g., 25%, 30%, 35%, etc.), at least 30% by weight (e.g., 30%, 40%, etc.), at least 40% by weight (e.g., 40%, 50%, 60%, 70%, 80%, 90%, 95%, or 100% by weight), at least 50% by weight (e.g., 50%, 60%, 70%, 80%, 90%, 95%, or 100% by weight), or more. In certain embodiments of the first and second embodiments, the DCPD-based resin comprises a majority by weight of DCPD as monomer, e.g., at least 51%, at least 60%, at least 70%, at least 80%, at least 90%, at least 95%, or even 100% by weight); in certain such embodiments, the DCPD-based resin can be considered to be a relatively pure DCPD resin, especially when the percentage by weight of DCPD monomer at least 80% (e.g., 80%, 81%, 82%, 83%, 84%, 85%, 86%, 87%, 88%, 89%, 90%, 91%, 92%, 93%, 94%, 95%, 96%, 97%, 98%, or more), at least 90% (e.g., 90%, 91%, 92%, 93%, 94%, 95%, 96%, 97%, 98%, or more), or more. In other embodiments of the first and second embodiments, the DCPD-based resin comprises a minority by weight of DCPD as monomer, e.g., no more than 49% (e.g., 49%, 45%, 40%, 35%, 30%, 25%, 20%, or less), no more than 40% (e.g., 40%, 35%, 30%, 25%, 20%, or less), no more than 30% (e.g., 30%, 25%, 20%, or less), no more than 20% (e.g., 20%, 19%, 18%, etc.), or any amount within one of the foregoing amounts, e.g., 49-20%, 40-20%, 30-20%, etc.

According to the first and second embodiments, the amount of DCPD-based resin (ii) that is present in the rubber composition for the tire tread may vary but generally will be at least 5 phr and up to 40 phr. In certain embodiments of the first and second embodiments, the amount of DCPD-based resin used in the resin component is 5-29 phr (e.g., 5, 6, 7, 8, 9, 10, 11, 12, 13, 14, 15, 16, 17, 18, 19, 20, 21, 22, 23, 24, 25, 26, 27, 28, or 29 phr), 5-20 phr (e.g., 5, 6, 7, 8, 9, 10, 11, 12, 13, 14, 15, 16, 17, 18, 19, or 20 phr), 5-15 phr (e.g., 5, 6, 7, 8, 9, 10, 11, 12, 13, 14, or 15 phr), 5-10 phr (e.g., 5, 6, 7, 8, 9 or 10 phr), or 10-20 phr.

In certain embodiments of the first and second embodiments, the DCPD-based resin (ii) is hydrogenated. In such embodiments, the amount of hydrogenation may vary. In certain embodiments, the hydrogenated DCPD-based resin has a degree of hydrogenation of at least 50%, at least 60%, at least 70%, or more. In certain embodiments, the hydrogenated DCPD-based resin has a degree of hydrogenation of 50-90%, 50-80%, 50-70%, 60-90%, 60-80%, or 60-70%.

DCPD-based resins suitable for use in the first and second embodiments are commercially available from various suppliers. As non-limiting examples, DCPD-based resins for use in the first and second embodiments are available from companies such as Neville Chemical Company (Pittsburgh, Pennsylvania) under their LX® brand, Resinall Corporation (Sovern, North Carolina), The Dow Chemical Company, and Zeon Corporation of Japan (doing business in the United States as Zeon Chemicals LP) under their Quintone® brand).

According to the first and second embodiments, the Tg and softening point of the DCPD-based resin (ii) may vary. In certain embodiments of the first and second embodiments, the DCPD-based resin (ii) has a Tg of about 35 to about 110° C. or 35-110° C. (e.g., 35, 40, 45, 50, 55, 60, 65, 70, 75, 80, 85, 90, 95, 100, 105, or 110° C.). In certain embodiments of the first and second embodiments, the DCPD-based resin (ii) has a softening point of about 90 to about 160° C. or 90-160° C. (e.g., 90, 95, 100, 105, 110, 115, 120, 125, 130, 135, 140, 145, 150, 155, or 160° C.). In certain preferred embodiments of the first and second embodiments, the DCPD-based resin (ii) has both a Tg and a softening point with the foregoing ranges.

In certain embodiments of the first and second embodiments, the DCPD-based resin (ii) has at least one of a Tg and a softening point at the lower end of above broadest ranges. For example, in such embodiments, the DCPD-based resin (ii) may have a Tg of about 35 to about 60° C. or 35-60° C. (e.g., 35, 36, 38, 40, 42, 44, 45, 46, 48, 50, 52, 54, 55, 56, 58, or 60° C.), or preferably about 40 to about 55° C., or 40-55° C. (e.g., 40, 42, 44, 45, 46, 48, 50, 52, 54, or 55° C.). In certain embodiments of the first and second embodiments, the DCPD-based resin (ii) has a softening point of about 90 to about 120° C., 90-120° C. (e.g., 90, 95, 100, 105, 110, 115, or 120° C.); preferably about 95 to about 115° C. or 95-115° C. (e.g., 95, 100, 105, 110, or 115° C.); or about 95 to about 110° C. or 95-110° C. (e.g., 95, 100, 105 or 110° C.). In certain preferred embodiments of the first and second embodiments, the DCPD-based resin (ii) has both a Tg and a softening point with the foregoing ranges.

In other embodiments of the first and second embodiments, the DCPD-based resin (ii) has at least one of a Tg and a softening point at the upper end of the above broadest ranges. For example, in such embodiments, the DCPD-based resin (ii) may have a Tg of about 70 to about 110° C.

or 70-110° C. (e.g., 70, 75, 80, 85, 90, 95, 100, 105, or 110° C.); preferably about 75 to about 105° C. or 75-105° C. (e.g., 75, 80, 85, 90, 95, 100 or 105° C.), or more preferably 80-100° C. (e.g., 80, 82, 84, 85, 86, 88, 90, 92, 94, 95, 96, 98, or 100° C.). In certain embodiments of the first and second embodiments, the DCPD-based resin (ii) has a softening point of about 120 to about 160° C. or 120-160° C. (e.g., 120, 125, 130, 135, 140, 145, 150, 155, or 160° C.), preferably about 130 to about 150° C. or 130-150° C. (e.g., 130, 135, 140, 145, or 150° C.). In certain preferred embodiments of the first and second embodiments, the DCPD-based resin (ii) has both a Tg and a softening point with the foregoing ranges.

According to the first and second embodiments, the Mw, Mn and Mw/Mn of the DCPD-based resin (ii) may vary. In certain embodiments of the first and second embodiments, the DCPD-based resin (ii) meets at least one of the following: (a) a Mw of about 1000 to about 4000 grams/mole, 1000-4000 grams/mole (e.g., 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 grams/mole), about 1000 to about 3000 grams/mole, 1000-3000 grams/mole (e.g., (e.g., 1000, 1100, 1200, 1300, 1400, 1500, 1600, 1700, 1800, 1900, 2000, 2100, 2200, 2300, 2400, 2500, 2600, 2700, 2800, 2900, or 3000 grams/mole), about 1000 to about 2500 grams/mole, 1000-2500 grams/mole (e.g., 1000, 1100, 1200, 1300, 1400, 1500, 1600, 1700, 1800, 1900, 2000, 2100, 2200, 2300, 2400, or 2500 grams/mole), about 1100 to about 2000 grams/mole, or 1100-2000 grams/mole (e.g., 1100, 1200, 1300, 1400, 1500, 1600, 1700, 1800, 1900, or 2000 grams/mole); (b) a Mn of about 700 to about 1500 grams/mole, 700-1500 grams/mole (e.g., 700, 800, 900, 1000, 1100, 1200, 1300, 1400, or 1500 grams/mole), about 800 to about 1400 grams/mole, 800-1400 grams/mole (e.g., 800, 900, 1000, 1100, 1200, 1300, or 1400 grams/mole), about 800 to about 1300 grams/mole, 800-1300 grams/mole (e.g., 800, 900, 1000, 1100, 1200, or 1300 grams/mole), about 900 to about 1200 grams/mole, or 900-1200 grams/mole (e.g., 900, 950, 1000, 1050, 1100, 1150, or 1200 grams/mole); or (c) a polydispersity (Mw/Mn) of about 1 to about 2.5, 1-2.5 (e.g., 1, 1.1, 1.2, 1.3, 1.4, 1.5, 1.6, 1.7, 1.8, 1.9, 2, 2.1, 2.2, 2.3, 2.4, or 2.5), about 1.1 to about 2.2, 1.1-2.2 (e.g., 1.1, 1.2, 1.3, 1.4, 1.5, 1.6, 1.7, 1.8, 1.9, 2, 2.1, or 2.2), about 1.1 to about 2, 1.1-2 (e.g., 1.1, 1.2, 1.3, 1.4, 1.5, 1.6, 1.7, 1.8, 1.9, or 2), about 1.2 to about 2, or 1.2 to 2 (e.g., 1.2, 1.3, 1.4, 1.5, 1.6, 1.7, 1.8, 1.9, or 2). In certain embodiments of the first and second embodiments, the DCPD-based resin has a Mw according to one of the ranges provided above, in combination with a Mn according to one of the ranges provided above, further in combination with a Mw/Mn according to one of the ranges provided above.

Filler Component

As mentioned above, according to the first and second embodiments, the rubber composition for the tire tread includes a filler component which comprises 91 to 140 phr of a reinforcing silica filler and 1 to 20 phr of a carbon black filler. In certain preferred embodiments of the first and second embodiments, the filler component comprises 100 to 130 phr of a reinforcing silica filler. In certain preferred embodiments of the first and second embodiments, the filler component comprises 5 to 10 phr of a carbon black filler. In certain particularly preferred embodiments, the filler component comprises reinforcing silica filler and carbon black filler with the foregoing preferred amounts. In certain embodiments of the first and second embodiments, the filler component is limited to (i.e., consists of or contains only) the reinforcing silica filler and carbon black filler in the foregoing discussed amounts. In other embodiments of the first and second embodiments, the filler component includes not only the reinforcing silica filler and carbon black filler in the foregoing discussed amounts but also one or more reinforcing or non-reinforcing fillers, as discussed in more detail below.

Reinforcing Silica Filler

As mentioned above, according to the first and second embodiments disclosed herein, the filler component of the rubber compositions for the tire tread comprises (includes) at least one reinforcing silica filler in an amount of 91-140 phr (e.g., 91, 93, 95, 97, 99, 100, 102, 104, 105, 106, 108, 110, 112, 114, 115, 116, 118, 120, 122, 124, 125, 126, 128, 130, 132, 134, 135, 136, 138, or 140 phr). In certain preferred embodiments of the first and second embodiments, the filler component of the rubber compositions for the tire tread comprises (includes) at least one reinforcing silica filler in an amount of 100-130 phr (e.g., 100, 102, 104, 105, 106, 108, 110, 112, 114, 115, 116, 118, 120, 122, 124, 125, 126, 128, or 130 phr).

According to the first and second embodiments, the surface area of the reinforcing silica filler may vary. According to the first and second embodiments, the particular type of silica for the at least one reinforcing silica filler may vary. Non-limiting examples of reinforcing silica fillers suitable for use in certain embodiments of the first and second embodiments include, but are not limited to, precipitated amorphous silica, wet silica (hydrated silicic acid), dry silica (anhydrous silicic acid), fumed silica, calcium silicate and the like. Other suitable reinforcing silica fillers for use in certain embodiments of the first and second embodiments include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4 \cdot 3SiO_4 \cdot 5H_2O$ etc.), aluminum calcium silicate ($Al_2O_3 \cdot CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the first and second embodiments disclosed herein, the rubber composition comprises a reinforcing silica filler having a surface area (as measured by the BET method) of about 100 $m^2/g$ to about 400 $m^2/g$, 100 $m^2/g$ to 400 $m^2/g$ (e.g., 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, or 400 $m^2/g$), about 100 $m^2/g$ to about 350 $m^2/g$, or 100 $m^2/g$ to 350 $m^2/g$ (e.g., 100, 110, 120, 130, 140, 150, 160, 170, 180, 190, 200, 210, 220, 230, 240, 250, 260, 270, 280, 290, 300, 310, 320, 330, 340, or 350 $m^2/g$). In certain embodiments of the first and second embodiments disclosed herein, the rubber composition comprises a reinforcing silica filler having a BET surface area of about 140 $m^2/g$ to about 230 $m^2/g$, 140 $m^2/g$ to 230 $m^2/g$ (e.g., 140, 150, 160, 170, 180, 190, 200, 210, 220, or 230 $m^2/g$), with the ranges of about 170 $m^2/g$ to about 230 $m^2/g$ and 170 $m^2/g$ to 230 $m^2/g$ (e.g., 170, 180, 190, 200, 210, 220, or 230 $m^2/g$) being included; in certain such embodiments the only silica filler present in the rubber composition has a BET surface area within one of the foregoing ranges. In other embodiments of the first and second embodiments disclosed herein, the rubber composition comprises a reinforcing silica filler having a BET surface of about 100 $m^2/g$ to about 140 $m^2/g$, 100 $m^2/g$ to 140 $m^2/g$ (e.g., 100, 105, 110, 115, 120, 125, 130, 135, or 140 $m^2/g$), about 100 $m^2/g$ to about 125 $m^2/g$, 100 $m^2/g$ to 125 $m^2/g$ (e.g., 100, 105, 110, 115, 120, or 125 $m^2/g$), about 100 $m^2/g$ to about 120 $m^2/g$, or 100 to 120 $m^2/g$ (e.g., 100, 105, 110, 115, or 120 $m^2/g$); in certain such embodiments the only silica filler present in the rubber composition has a BET surface area within one of the foregoing ranges. In certain embodiments of the first and second embodiments disclosed herein, the rubber composition comprises reinforcing silica filler having a pH of about 5.5 to about 8, 5.5 to 8 (e.g., 5.5, 5.7, 5.9, 6.1, 6.3, 6.5, 6.7, 6.9, 7.1, 7.3, 7.5, 7.7, 7.9, or 8), about 6 to about 8, 6 to 8 (e.g., 6, 6.2, 6.4, 6.6, 6.8, 7, 7.2, 7.4, 7.6, 7.8, or 8), about 6 to about 7.5, 6 to 7.5, about 6.5 to about 8, 6.5 to 8, about 6.5 to about 7.5, 6.5 to 7.5, about 5.5 to about 6.8, or 5.5 to 6.8. Some of the commercially available reinforcing silica fillers which can be used in certain embodiments of the first and second embodiments include, but are not limited to, Hi-Sil® EZ120G, Hi-Sil® EZ120G-D, Hi-Sil® 134G, Hi-Sil®EZ 160G, Hi-Sil®EZ 160G-D, Hi-Sil®190, Hi-Sil®190G-D, Hi-Sil® EZ 200G, Hi-Sil® EZ 200G-D, Hi-Sil® 210, Hi-Sil® 233, Hi-Sil® 243LD, Hi-Sil® 255CG-D, Hi-Sil® 315-D, Hi-Sil® 315G-D, Hi-Sil® HDP 320G and the like, produced by PPG Industries (Pittsburgh, Pa.) As well, a number of useful commercial grades of different reinforcing silica fillers are also available from Evonik Corporation (e.g., Ultrasil® 320 GR, Ultrasil® 5000 GR, Ultrasil® 5500 GR, Ultrasil® 7000 GR, Ultrasil® VN2 GR, Ultrasil® VN2, Ultrasil® VN3, Ultrasil® VN3 GR, Ultrasil® 7000 GR, Ultrasil® 7005, Ultrasil® 7500 GR, Ultrasil® 7800 GR, Ultrasil® 9500 GR, Ultrasil® 9000 G, Ultrasil® 9100 GR), and Solvay (e.g., Zeosil® 1115MP, Zeosil® 1085GR, Zeosil® 1165MP, Zeosil® 1200MP, Zeosil® Premium, Zeosil® 195HR, Zeosil® 195GR, Zeosil® 185GR, Zeosil® 175GR, and Zeosil® 165 GR).

Silica Coupling Agent

In certain embodiments of the first and second embodiments disclosed herein, one or more than one silica coupling agent may also (optionally) be utilized. In preferred embodiments of the first and second embodiments, at least one silica coupling agent is utilized. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processability and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the first and second embodiments disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^{10}_pSi(OR^{11})_{4-p}$ where each $R^{11}$ is independently a monovalent organic group, and p is an integer from 1 to 3, with the proviso that at least one $R^{10}$ is an alkyl group. Preferably p is 1. Generally, each $R^{10}$ independently comprises $C_1$ to $C_{20}$ aliphatic, $C_5$ to $C_{20}$ cycloaliphatic, or $C_6$ to $C_{20}$ aromatic; and each $R^{11}$ independently comprises $C_1$ to $C_6$ aliphatic. In certain exemplary embodiments, each $R^{10}$ independently comprises $C_6$ to $C_{15}$ aliphatic and in additional embodiments each $R^{10}$ independently comprises $C_8$ to $C_{14}$ aliphatic. Mercapto silanes have the general formula $HS—R^{13}—Si(R^{14})(R^{15})_2$ where $R^{13}$ is a divalent organic group, $R^{14}$ is a halogen atom or an alkoxy group, each $R^{15}$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B—S—R^{16}—Si—X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^{16}$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in certain embodiments of the first and second embodiments include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in certain embodiments of the first and second embodiments include bis(trialkoxysilylorgano) disulfides and bis(trialkoxysilylorgano)tetrasulfides. Specific non-limiting examples of bis(trialkoxysilylorgano)disulfides include, but are not limited to, 3,3'-bis(triethoxysilylpropyl) disulfide, 3,3'-bis(trimethoxysilylpropyl) disulfide, 3,3'-bis(tributoxysilylpropyl)disulfide, 3,3'-bis(tri-t-butoxysilylpropyl)disulfide, 3,3'-bis(trihexoxysilylpropyl) disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano)tetrasulfide silica coupling agents suitable for use in certain embodiments of the first and second embodiments include, but are not limited to, bis(3-triethoxysilylpropyl)tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain embodiments of the first and second embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiments of the first and second embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, NY.

Non-limiting examples of pre-treated silicas (i.e., silicas that have been pre-surface treated with a silane) suitable for use in certain embodiments of the first and second embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane bis(triethoxysilylpropyl) polysulfide (Si69) and Ultrasil® VN3 silica. Coupsil 6508, Agilon 400™ silica from PPG Industries, Agilon 454® silica from PPG Industries, and 458® silica from PPG Industries. In those embodiments where the silica comprises a pre-treated silica, the pre-treated silica is used in an amount as previously disclosed for the silica filler (i.e., 81-120 phr or about 90 to about 120 phr, etc.).

When a silica coupling agent is utilized in an embodiment of the first and second embodiments, the amount used may vary. In certain embodiments of the first and second embodiments, the rubber compositions do not contain any silica coupling agent. In other preferred embodiments of the first and second embodiments, the silica coupling agent is present in an amount sufficient to provide a ratio of the total amount of silica coupling agent to silica filler of about 0.1:100 to about 1:5 (i.e., about 0.1 to about 20 parts by weight per 100 parts of silica), including 0.1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In preferred embodiments of the first and second embodiments, the ratio of the total amount of silica coupling agent to silica filler falls within a ratio of 1:10 to 1:20 (i.e., 10 to 5 parts by weight per 100 parts of silica). In certain embodiments according to the first and second embodiments, the rubber composition comprises about 0.1 to about 15 phr silica coupling agent, including 0.1 to 15 phr (e.g., 0.1, 0.5, 1, 2, 3, 4, 5, 6, 7, 8, 9, 10, 11, 12, 13, 14, or 15 phr), about 0.1 to about 12 phr, 0.1 to 12 phr, about 0.1 to about 10 phr, 0.1 to 10 phr, about 0.1 to about 7 phr, 0.1 to 7 phr, about 0.1 to about 5 phr, 0.1 to 5 phr, about 0.1 to about 3 phr, 0.1 to 3 phr, about 1 to about 15 phr, 1 to 15 phr (e.g., 1, 2, 3, 4, 5, 6, 7, 8, 9, 10, 11, 12, 13, 14, or 15 phr), about 1 to about 12 phr, 1 to 12 phr (e.g., 1, 2, 3, 4, 5, 6, 7, 8, 9, 10, 11, or 12 phr), about 1 to about 10 phr, 1 to 10 phr (e.g., 1, 1.5, 2, 2.5, 3, 3.5, 4, 4.5, 5, 5.5, 6, 6.5, 7, 7.5, 8, 8.5, 9, 9.5, or 10 phr), about 1 to about 7 phr, 1 to 7 phr, about 1 to about 5 phr, 1 to 5 phr, about 1 to about 3 phr, 1 to 3 phr, about 3 to about 15 phr, 3 to 15 phr, about 3 to about 12 phr, 3 to 12 phr, about 3 to about 10 phr, 3 to 10 phr, about 3 to about 7 phr, 3 to 7 phr, about 3 to about 5 phr, 3 to 5 phr, about 5 to about 15 phr, 5 to 15 phr, about 5 to about 12 phr, 5 to 12 phr, about 5 to about 10 phr, 5 to 10 phr, about 5 to about 7 phr, or 5 to 7 phr. In preferred embodiments of the first and second embodiments, the rubber composition comprises silica coupling agent in an amount of 8 to 12 phr or one of the foregoing ranges falling within this range.

Carbon Black Filler

According to the first and second embodiments disclosed herein, the amount of carbon black filler used in the rubber composition for the tread is limited. More specifically, according to the first and second embodiments disclosed herein, the filler component of the rubber composition includes only 1 to 20 phr of carbon black filler (e.g., 1, 2, 3, 4, 5, 6, 7, 8, 9, 10, 11, 12, 13, 14, 15, 16, 17, 18, 19 or 20 phr). In certain preferred embodiments of the first and second embodiments, the tread rubber composition contains only 5-10 phr of carbon black filler (e.g., 5, 6, 7, 8, 9, or 10 phr). In certain embodiments of the first and second embodiments, the foregoing limited amounts of carbon black filler should be understood to refer to reinforcing carbon black filler (in other words, 1 to 20 phr of reinforcing carbon black filler or 5-10 phr of reinforcing carbon black filler is used). In other embodiments of the first and second embodiments, the foregoing limited amounts of carbon black filler should be understood to refer to non-reinforcing carbon black filler (in other words, 1 to 20 phr of non-reinforcing carbon black filler or 5-10 phr of non-reinforcing carbon black filler). In yet other embodiments of the first and second embodiments, the foregoing limited amounts of carbon black filler should be understood to refer to a combination of carbon black fillers (i.e., both reinforcing and non-reinforcing carbon black filler).

According to the first and second embodiments, the particular type or types of carbon black utilized may vary. Generally, suitable carbon blacks for use as a reinforcing filler in the rubber composition of certain embodiments of the first and second embodiments include any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used herein for carbon blacks are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first and second embodiments, the rubber composition includes a mixture of two or more of the foregoing blacks. Preferably according to the first and second embodiments, if a carbon black filler is present it consists of only one type (or grade) of reinforcing carbon black. Typical suitable carbon blacks for use in certain embodiments of the first and second embodiments are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Other Reinforcing Fillers

In certain embodiments of the first and second embodiments, the tread rubber composition comprises a reinforcing filler other than carbon black or silica (i.e., an additional reinforcing filler). While one or more than one additional reinforcing filler may be utilized, their total amount is preferably limited to no more than 10 phr (e.g., 10, 9, 8, 7, 6, 5, 4, 3, 2, 1 or 0 phr), or no more than 5 phr (e.g., 5, 4, 3, 2, 1, or 0 phr). In certain preferred embodiments of the first and second embodiments, the tread rubber composition contains no additional reinforcing filler (i.e., 0 phr); in other words, in such embodiments no reinforcing filler other than silica and optionally carbon black are present.

In those embodiments of the first and second embodiments wherein an additional reinforcing filler is utilized, the additional reinforcing filler or fillers may vary. Non-limiting examples of suitable additional reinforcing fillers for use in the rubber compositions of certain embodiments of the first and second embodiments include, but are not limited to, alumina, aluminum hydroxide, clay (reinforcing grades), magnesium hydroxide, boron nitride, aluminum nitride, titanium dioxide, reinforcing zinc oxide, and combinations thereof.

Non-Reinforcing Fillers

In certain embodiments of the first and second embodiments, the rubber composition for the tread further comprises at least one non-reinforcing filler which is a non-carbon black non-reinforcing filler. In other preferred embodiments of the first and second embodiments, the rubber composition contains no non-carbon black non-reinforcing fillers (i.e., 0 phr). In yet other embodiments of the first and second embodiments, the rubber composition contains no non-reinforcing fillers (in such embodiments, the carbon black filler of the filler component will be a reinforcing carbon black filler). In embodiments of the first and second embodiments wherein at least one non-carbon black non-reinforcing filler is utilized, the at least one non-reinforcing filler may be selected from clay (non-reinforcing grades), graphite, magnesium dioxide, aluminum oxide, starch, boron nitride (non-reinforcing grades), silicon nitride, aluminum nitride (non-reinforcing grades), calcium silicate, silicon carbide, ground rubber, and combinations thereof. The term "non-reinforcing filler" is used to refer to a particulate material that has a nitrogen absorption specific surface area ($N_2SA$) of less than about 20 $m^2/g$ (including less than 20 $m^2/g$), and in certain embodiments less than about 10 $m^2/g$ (including less than 10 $m^2/g$). The $N_2SA$ surface area of a particulate material can be determined according to various standard methods including ASTM D6556. In certain embodiments, the term "non-reinforcing filler" is alternatively or additionally used to refer to a particulate material that has a particle size of greater than about 1000 nm (including greater than 1000 nm). In those embodiments of the first and second embodiments, wherein a non-carbon black non-reinforcing filler is present in the rubber composition, the total amount of non-carbon black non-reinforcing filler may vary but is preferably no more than 20 phr (e.g., 20, 19, 18, 17, 16, 15, 14, 13, 12, 11, 10, 9, 8, 7, 6, 5, 4, 3, 2, or 1 phr), and in certain embodiments 1-10 phr, no more than 10 phr, no more than 5 phr (e.g., 5, 4, 3, 2, or 1 phr), 1-5 phr, or no more than 1 phr.

Liquid Plasticizer

As mentioned above, according to the first and second embodiments, the rubber composition for the tire tread comprises (includes) 0 to 30 phr of a liquid plasticizer. By stating that the lower limit for the liquid plasticizer is 0 phr is meant that the liquid plasticizer component is optional in certain embodiments of the first and second embodiments. The phrase liquid plasticizer should be understood to refer to plasticizers that are liquid at 25° C., including, but not limited, to oils and ester plasticizers. Generally, according to the first and second embodiments, when a liquid plasticizer is used one or more than one liquid plasticizer may be utilized. The total amount of liquid plasticizer may be referred to as the amount of plasticizer component. In certain embodiments of the first and second embodiments, the rubber composition includes 1 to 30 phr of liquid plasticizer (e.g., 1, 2, 4, 6, 8, 10, 12, 14, 15, 16, 18, 20, 22, 24, 25, 26, 28, or 30 phr) or an amount falling within the foregoing range such as 1 to 20 phr or 5 to 20 phr, preferably 10 to 30 phr (e.g., 10, 12, 14, 15, 16, 18, 20, 22, 24, 25, 26, 28, or 30 phr) of liquid plasticizer or an amount falling within such as 10 to 25 phr or 10 to 20 phr. The term oil is meant to encompass both free oil (which is usually added during the compounding process) and extender oil (which is used to extend a rubber). As a non-limiting example, by stating that the rubber composition includes 20 phr of oil it should be understood that the total amount of any free oil and any extender oil is 20 phr. Similarly, by stating that the rubber composition contains 20 phr of liquid plasticizer, it should be understood that the total amount of any liquid plasticizer (including free oil, extender oil, and ester plasticizer) is 20 phr. In certain embodiments of the first and second embodiments, when the tread rubber composition contains oil, the only oil is free oil in one of the foregoing amounts (e.g., 1 to 30 phr, 10 to 30 phr, 5 to 20 phr, etc.). In other embodiments of the first and second embodiments, when the tread rubber composition contains oil, the only oil is extender oil in one of the foregoing amounts (e.g., 1 to 30 phr, 10 to 30 phr, 5 to 20 phr, etc.). In those embodiments of the first and second embodiments wherein an oil-extended rubber is used the amount of oil used to prepare the oil-extended rubber may vary; in certain such embodiments, the amount of extender oil present in the oil-extended rubber (polymer) is 10-50 parts oil per 100 parts of rubber (e.g., 10, 15, 20, 25, 30, 35, 40, 45 or 50 parts oil per 100 parts of rubber), preferably 10-40 parts oil per 100 parts of rubber or 20-40 parts oil per 100 parts of rubber. When an oil-extended rubber is used in the elastomer component of the rubber composition disclosed herein, the amounts specified for the rubber(s) of the elastomer component, as discussed above, should be understood to refer to the amounts of rubber only rather than the amounts of oil-extended rubber. As a non-limiting example, extender oil could be used in an amount of 40 parts oil per 100 parts rubber in an SBR used in an amount of 15 parts in the overall rubber composition and, thus, the amount of oil contributed by the oil-extended SBR to the rubber composition would be described as 6 phr.

As used herein, oil refers to both petroleum based oils (e.g., aromatic, naphthenic, and low PCA oils) as well as plant oils (such as can be harvested from vegetables, nuts, and seeds). Plant oils will generally comprise triglycerides and the term should be understood to include synthetic triglycerides as well as those actually sourced from a plant.

According to the first and second embodiments when one or more oils are present in the rubber composition, various types of processing and extender oils may be utilized, including, but not limited to aromatic, naphthenic, and low PCA oils (petroleum-sourced or plant-sourced). Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Exemplary petroleum-sourced low PCA oils include mild extraction solvates (MES), treated distillate aromatic extracts (TDAE), TRAE, and heavy naphthenics. Exemplary MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES S201 from AGIP. Exemplary TDAE oils are available as TYREX 20 from EXXONMOBIL, VIVATEC 500, VIVATEC 180, and ENERTHENE 1849 from BP, and EXTENSOIL 1996 from REPSOL. Exemplary heavy naphthenic oils are available as SHELLFLEX 794, ERGON BLACK OIL, ERGON H2000, CROSS C2000, CROSS C2400, and SAN JOAQUIN 2000L. Exemplary low PCA oils also include various plant-sourced oils such as can be harvested from vegetables, nuts, and seeds. Non-limiting examples include, but are not limited to, soy or soybean oil, sunflower oil (including high oleic sunflower oil), safflower oil, corn oil, linseed oil, cotton seed oil, rapeseed oil, cashew oil, sesame oil, camellia oil, jojoba oil, hemp oil, macadamia nut oil, coconut oil, and palm oil. The foregoing processing oils can be used as an extender oil, i.e., to prepare an oil-extended polymer or copolymer or as a processing or free oil.

In those embodiments of the first and second embodiments wherein one or more oils are present in the rubber composition, the Tg of the oil or oils used may vary. In certain embodiments of the first and second embodiments, any oil utilized has a Tg of about −40 to about −100° C., −40 to −100° C. (e.g., −40, −45, −50, −55, −60, −65, −70, −75, −80, −85, −90, −95, or −100° C.), about −40 to about −90° C., −40 to −90° C. (e.g., −40, −45, −50, −55, −60, −65, −70, −75, −80, −85, or −90° C.), about −45 to about −85° C., −45 to −85° C. (e.g., −45, −50, −55, −60, −65, −70, −75, −80, or −85° C.), about −50 to about −80° C., or −50 to −80° C. (e.g., −50, −55, −60, −65, −70, −75, or −80° C.).

Preferably according to the first and second embodiments, the rubber composition contains less than 5 phr (e.g., 4.5, 4, 3, 2, 1, or 0 phr) of MES or TDAE oil, preferably no MES or TDAE oil (i.e., 0 phr). In certain embodiments of the first and second embodiments, the rubber composition contains no petroleum oil (i.e., 0 phr) and instead any oil utilized is a plant oil. In certain embodiments of the first and second embodiments, the rubber composition contains soybean oil in one of the above-mentioned amounts; in certain such embodiments the only oil included is soybean oil. In certain embodiments of the first and second embodiments, the rubber composition contains no sunflower oil (i.e., 0 phr). In other embodiments of the first and second embodiments, the only oil included is sunflower oil.

In certain embodiments of the first and second embodiments, the tread rubber composition includes one or more ester plasticizers, which is a type of plasticizer that is generally liquid at room temperature. Suitable ester plasticizers are known to those of skill in the art and include, but are not limited to, phosphate esters, phthalate esters, adipate esters and oleate esters (i.e., derived from oleic acid). Taking into account that an ester is a chemical compound derived from an acid wherein at least one —OH is replaced with an —O-alkyl group, various alkyl groups may be used in suitable ester plasticizers for use in the tread rubber compositions, including generally linear or branched alkyl of $C_1$ to $C_{20}$ (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$), or $C_6$ to $C_{12}$. Certain of the foregoing esters are based upon acids which have more than one —OH group and, thus, can accommodate one or more than one O-alkyl group (e.g., trialkyl phosphates, dialkyl phthalates, dialkyl adipates). Non-limiting examples of suitable ester plasticizers include trioctyl phosphate, dioctyl phthalate, dioctyl adipate, nonyl oleate, octyl oleate, and combinations thereof. The use of an ester plasticizer such as one or more of the foregoing may be beneficial to the snow or ice performance of a tire made from a tread rubber composition containing such ester plasticizer at least in part due to the relatively low Tg of ester plasticizers. In certain embodiments of the first and second embodiments, the tread rubber composition includes one or more ester plasticizers having a Tg of −40° C. to −70° C. (e.g., −40, −45, −50, −55, −60, −65, or −70° C.), or −50° C. to −65° C. (e.g., −50, −51, −52, −53, −54, −55, −56, −57, −58, −59, −60, −61, −62, −63, −64, or −65° C.). In those embodiments of the first and second embodiments wherein one or more ester plasticizers is utilized the amount utilized may vary. In certain embodiments of the first and second embodiments, one or more ester plasticizers are utilized in a total amount of 1-25 phr (e.g., 1, 2, 3, 4, 5, 6, 7, 8, 9, 10, 11, 12, 13, 14, 15, 16, 17, 18, 19, 20, 21, 22, 23, 24, or 25 phr), 1-20 phr (e.g., 1, 2, 3, 4, 5, 6, 7, 8, 9, 10, 11, 12, 13, 14, 15, 16, 17, 18, 19, or 20 phr), 1-15 phr (e.g., 1, 2, 3, 4, 5, 6, 7, 8, 9, 10, 11, 12, 13, 14, or 15 phr), 1-10, phr (e.g., 1, 2, 3, 4, 5, 6, 7, 8, 9, or 10 phr), 2-6 phr (e.g., 2, 3, 4, 5, or 6 phr) or 2-5 phr (e.g., 2, 3, 4, or 5 phr). In certain preferred embodiments of the first and second embodiments, the amount of any ester plasticizer is no more than 15 phr or no more than 12 phr. In certain embodiments of the first and second embodiments, one or more ester plasticizers are used (in one of the foregoing amounts) in combination with oil where the oil is present in an amount of 1 to less than 10 phr, or 1-5 phr. In other embodiments of the first and second embodiments, one or more ester plasticizers is used without any oil being present in the tread rubber composition (i.e., 0 phr of oil).

In certain embodiments of the first and second embodiments, the rubber composition comprises a total amount of plasticizer of 30-70 phr (e.g., 30, 32, 34, 35, 36, 38, 40, 42, 44, 45, 46, 48, 50, 52, 54, 55, 56, 58, 60, 62, 64, 65, 66, 68, or 70 phr), with the plasticizer including the resins of the resin component and any liquid plasticizer (e.g., any oil and any ester plasticizer), all as discussed above. In certain embodiments of the first and second embodiments, the rubber composition comprises a total amount of plasticizer of no more than 60 phr (e.g., 60, 55, 50, 45, 40, 35 or 30 phr), 20-60 phr (e.g., 20, 22, 24, 25, 26, 28, 30, 32, 34, 35, 36, 38, 40, 42, 44, 45, 46, 48, 50, 52, 54, 55, 56, 58, or 60 phr), 30-60 phr (e.g., 30, 32, 34, 35, 36, 38, 40, 42, 44, 45, 46, 48, 50, 52, 54, 55, 56, 58, or 60 phr), 40-60 phr (e.g., 40, 42, 44, 45, 46, 48, 50, 52, 54, 55, 56, 58, or 60 phr), no more than 50 phr (e.g., 50, 45, 40, 35, or 30 phr), 20-50 phr (e.g., 20, 22, 24, 25, 26, 28, 30, 32, 34, 35, 36, 38, 40, 42, 44, 45, 46, 48, or 50 phr), or 30-50 phr (e.g., 30, 32, 34, 35, 36, 38, 40, 42, 44, 45, 46, 48, or 50 phr). In certain of the foregoing embodiments, the total amount of plasticizer includes a minority by weight of liquid plasticizer (e.g., no more than 49% by weight, no more than 40% by weight, no more than 30% by weight, no more than 25% by weight, no more than 20% by weight, no more than 10% by weight, or no more than 5% by weight).

Cure Package

As discussed above, according to the first and second embodiments disclosed herein, the rubber composition used for the tire tread includes (comprises) a cure package. Although the contents of the cure package may vary according to the first and second embodiments, generally, the cure package includes at least one of: a vulcanizing agent; a vulcanizing accelerator; a vulcanizing activator (e.g., zinc oxide, stearic acid, and the like); a vulcanizing inhibitor; and an anti-scorching agent. In certain embodiments of the first and second embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Various vulcanizing inhibitors and anti-scorching agents are known in the art and can be selected by one skilled in the art based on the vulcanizate properties desired.

Examples of suitable types of vulcanizing agents for use in certain embodiments of the first and second embodiments, include but are not limited to, sulfur or peroxide-based curing components. Thus, in certain such embodiments, the cure package includes a sulfur-based curative or a peroxide-based curative. In preferred embodiments of the first and second embodiments, the vulcanizing agent is a sulfur-based curative; in certain such embodiments the vulcanizing agent consists of (only) a sulfur-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents may be used in certain embodiments of the first and second embodiments in an amount ranging from 0.1 to 10 phr (e.g., 0.1, 0.5, 1, 2, 3, 4, 5, 6, 7, 8, 9, or 10 phr), including from 1 to 7.5 phr, including from 1 to 5 phr, and preferably from 1 to 3.5 phr (e.g., 1, 1.5, 2, 2.5, 3, or 3.5 phr).

Vulcanizing accelerators are used to control the time and/or temperature required for vulcanization and to improve properties of the vulcanizate. Examples of suitable vulcanizing accelerators for use in certain embodiments of the first and second embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr (e.g., 0.1, 0.5, 1, 2, 3, 4, 5, 6, 7, 8, 9, or 10 phr), preferably 0.5 to 5 phr (e.g., 0.5, 1, 1.5, 2, 2.5, 3, 3.5, 4, 4.5, or 5 phr). Preferably, any vulcanization accelerator used in the rubber compositions of the first and second embodiments excludes any thiurams such as thiuram monosulfides and thiuram polysulfides (examples of which include TMTM (tetramethyl thiuram monosulfide), TMTD (tetramethyl thiuram disulfide), DPTT (dipentamethylene thiuram tetrasulfide), TETD (tetraethyl thiuram disulfide), TiBTD (tetraisobutyl thiuram disulfide), and TBzTD (tetrabenzyl thiuram disulfide)); in other words, the rubber compositions of the first and second embodiments preferably contain no thiuram accelerators (i.e., 0 phr).

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, in certain embodiments of the first and second embodiments the amount of vulcanization activator used ranges from 0.1 to 6 phr (e.g., 0.1, 0.5, 1, 1.5, 2, 2.5, 3, 3.5, 4, 4.5, 5, 5.5, or 6 phr), preferably 0.5 to 4 phr (e.g., 0.5, 1, 1.5, 2, 2.5, 3 3.5, or 4 phr). In certain embodiments of the first and second embodiments, both zinc oxide and stearic acid are used as vulcanizing activators with the total amount utilized falling within one of the foregoing ranges; in certain such embodiments, the only vulcanizing activators used are zinc oxide and stearic acid. In certain embodiments of the first and second embodiments, one or more vulcanization activators are used which includes one or more thiourea compounds (used in the of the foregoing amounts), and optionally in combination with one or more of the foregoing vulcanization activators. Generally, a thiourea compound can be understood as a compound having the structure $(R^1)(R^2)NS(=C)N(R^3)(R^4)$ wherein each of $R^1$, $R^2$, $R^3$, and $R^4$ are independently selected from H, alkyl, aryl, and N-containing substituents (e.g., guanyl). Optionally, two of the foregoing structures can be bonded together through N (removing one of the R groups) in a dithiobiurea compound. In certain embodiments, one of $R^1$ or $R^2$ and one of $R^3$ or $R^4$ can be bonded together with one or more methylene groups ($-CH_2-$) therebetween. In certain embodiments of the first and second embodiments, the thiourea has one or two of $R^1$, $R^2$, $R^3$ and $R^4$ selected from one of the foregoing groups with the remaining R groups being hydrogen. Exemplary alkyl include $C_1$-$C_6$ linear, branched or cyclic groups such as methyl, ethyl, propyl, iso-propyl, butyl, iso-butyl, pentyl, hexyl, and cyclohexyl. Exemplary aryl include $C_6$-$C_{12}$ aromatic groups such as phenyl, tolyl, and naphthyl. Exemplary thiourea compounds include, but are not limited to, dihydrocarbylthioureas such as dialkylthioureas and diarylthioureas. Non-limiting examples of particular thiourea compounds include one or more of thiourea, N,N'-diphenylthiourea, trimethylthiourea, N,N'-diethylthiourea (DEU), N,N'-dimethylthiourea, N,N'-dibutylthiourea, ethylenethiourea, N,N'-diisopropylthiourea, N,N'-dicyclohexylthiourea, 1,3-di(o-tolyl)thiourea, 1,3-di (p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, and o-tolylthiourea. In certain embodiments of the first and second embodiments, the activator includes at least one thiourea compound selected from thiourea, N,N'-diethylthiourea, trimethylthiourea, N,N'-diphenylthiourea, and N—N'-dimethylthiourea.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, in certain embodiments of the first and second embodiments the amount of vulcanization inhibitor is 0.1 to 3 phr (e.g., 0.1, 0.5, 1, 1.5, 2, 2.5, or 3 phr), preferably 0.5 to 2 phr (e.g., 0.5, 1, 1.5, or 2 phr).

Other Ingredients

Various other ingredients that may optionally be added to the rubber compositions of the first and second embodiment as disclosed herein include waxes (which in some instances are antioxidants), processing aids, reinforcing resins, peptizers, and antioxidants/antidegradant. Ingredients which are antidegradants may also be classified as an antiozonant or antioxidant, such as those selected from: N,N'disubstituted-p-phenylenediamines, such as N-1,3-dimethylbutyl-N'phenyl-p-phenylenediamine (6PPD), N,N'-Bis(1,4-dimethylpently)-p-phenylenediamine (77PD), N-phenyl-N-isopropyl-p-phenylenediamine (IPPD), and N-phenyl-N'-(1,3-dimethylbutyl)-p-phenylenediamine (HPPD). Other examples of antidegradants include, acetone diphenylamine condensation product, 2,4-Trimethyl-1,2-dihydroquinoline, Octylated Diphenylamine, 2,6-di-t-butyl-4-methyl phenol and certain waxes. In certain other embodiments of the first and second embodiments, the composition may be free or essentially free of antidegradants such as antioxidants or antiozonants.

Preparing the Rubber Compositions

The particular steps involved in preparing the rubber compositions of the first and second embodiments disclosed herein are generally those of conventionally practiced methods comprising mixing the ingredients in at least one non-productive master-batch stage and a final productive mixing stage. In certain embodiments of the first and second embodiments, the tread rubber composition is prepared by combining the ingredients for the rubber composition (as disclosed above) by methods known in the art, such as, for example, by kneading the ingredients together in a Banbury mixer or on a milled roll. Such methods generally include at least one non-productive master-batch mixing stage and a final productive mixing stage. The term non-productive master-batch stage is known to those of skill in the art and generally understood to be a mixing stage (or stages) where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the first and second embodiments, the rubber composition is prepared by a process comprising more than one non-productive master-batch mixing stage.

In certain preferred embodiments of the first and second embodiments, the tread rubber composition is prepared by a process wherein the master-batch mixing stage includes at least one of tandem mixing or intermeshing mixing. Tandem mixing can be understood as including the use of a mixer with two mixing chambers with each chamber having a set of mixing rotors; generally, the two mixing chambers are stacked together with the upper mixer being the primary mixer and the lower mixer accepting a batch from the upper or primary mixer. In certain embodiments, the primary mixer utilizes intermeshing rotors and in other embodiments the primary mixer utilizes tangential rotors. Preferably, the lower mixer utilizes intermeshing rotors. Intermeshing mixing can be understood as including the use of a mixer with intermeshing rotors. Intermeshing rotors refers to a set of rotors where the major diameter of one rotor in a set interacts with the minor diameter of the opposing rotor in the set such that the rotors intermesh with each other. Intermeshing rotors must be driven at an even speed because of the interaction between the rotors. In contrast to intermeshing rotors, tangential rotors refers to a set of rotors where each rotor turns independently of the other in a cavity that may be referred to as a side. Generally, a mixer with tangential rotors will include a ram whereas a ram is not necessary in a mixer with intermeshing rotors.

Generally, the rubbers (or polymers) and at least one reinforcing filler (as well as any silane coupling agent, liquid plasticizer and resin) will be added in a non-productive or master-batch mixing stage or stages. Generally, at least the vulcanizing agent component and the vulcanizing accelerator component of a cure package will be added in a final or productive mixing stage.

In certain embodiments of the first and second embodiments, the rubber composition is prepared using a process wherein at least one non-productive master batch mixing stage is conducted at a temperature of about 130° C. to about 200° C. In certain embodiments of the first and second embodiments, the tread rubber composition is prepared using a final productive mixing stage conducted at a temperature below the vulcanization temperature in order to avoid unwanted pre-cure of the rubber composition. Therefore, the temperature of the productive or final mixing stage generally should not exceed about 120° C. and is typically about 40° C. to about 120° C., or about 60° C. to about 110° C. and, especially, about 75° C. to about 100° C. In certain embodiments of the first and second embodiments, the tread rubber composition is prepared according to a process that includes at least one non-productive mixing stage and at least one productive mixing stage. The use of silica fillers may optionally necessitate a separate re-mill stage for separate addition of a portion or all of such filler. This stage often is performed at temperatures similar to, although often slightly lower than, those employed in the masterbatch stage, i.e., ramping from about 90° C. to a drop temperature of about 150° C.

Properties of the Rubber Composition Used for the Tire Tread

As mentioned above, according to the first embodiment, the tread of the tire has an improved wet performance and improved stiffness. As also mentioned above, according to the second embodiment, a method is provided for improving the wet performance and stiffness of a tire tread. Measurements of E' (dynamic storage modulus) at different temperatures can provide an indication of various properties of a rubber composition when it is utilized as a tire tread (e.g., E' at −20° C. correlates to snow traction with a relatively lower E' indicating better snow traction, and E' at 30° C. correlates to stiffness or cornering with a relatively higher E' indicating improved stiffness or cornering). When the rubber composition is incorporated into a tire tread, steering stability including cornering on a dry road surface is generally impacted by E' at higher temperatures (e.g., 30° C.) with higher values preferred and snow traction is generally impacted by E' at lower temperatures (e.g., −20° C. and −40° C.) with lower values preferred. The measurements and performance referred to herein can be measured upon a slab of cured rubber composition (the rubber composition being as discussed herein for the first and second embodiments) that has been prepared in a laboratory or can be measured upon a sample cut from a tire tread (e.g., that contains a cured version of a rubber composition as discussed herein for the first and second embodiments).

The stiffness properties referred to herein can be quantified by measuring the E' at 30° C. of a sample rubber composition after curing at 170° C. for 15 minutes. E' measurements can be performed using Gabo equipment according to the following methods. Gabo measurements may be made using a dynamic mechanical thermal spectrometer (Eplexor® 500N from Gabo Qualimeter Testanlagen GmbH of Ahiden, Germany) under the following conditions: measurement mode: tensile test mode, measuring frequency: 52 Hz, applying 0.2% strain from 50 to −5° C. and 1% strain from −5 to 65° C., measuring temperatures (including e.g., −20° C., 30° C., etc.), sample shape: 4.75 mm wide×29 mm long×2.0 mm thick.

Measurements of tan 6 at various temperatures can be used to quantify the expected wet performance and rolling resistance of the rubber compositions when they are incorporated into tire treads. Tan 6 values can be measured with a dynamic mechanical thermal spectrometer (Eplexor® 500N from Gabo Qualimeter Testanlagen GmbH of Ahiden, Germany) generally following the guidelines of ASTM D5992-96 (2011) under the following conditions: measurement mode: tensile test mode; measuring frequency: 52 Hz; temperature sweep measurement, applying 0.2% strain from −50 to −5° C. and 1% strain from −5 to 65° C., with the starting temperature being somewhat below −50° C. and the ending temperature being somewhat above −5° C.; collecting data approximately every 1° C. in order to provide measurements at temperatures of −30° C., 0° C., 30° C., and 60° C.; sample shape: 4.75 mm wide×29 mm long×2.0 mm thick. Measurement is made upon a cured sample of rubber (cured for 15 minutes at 170° C.). A rubber composition's tan 6 at 0° C. is indicative of its wet traction when incorporated into a tire tread and its tan 6 at 60° C. is indicative of its rolling resistance when incorporated into a tire tread.

In certain embodiments of the first and second embodiments, the rubber composition for the tire tread has a stiffness as measured by E' at 30° C. of at least 15 (e.g., 15, 16, 17, 18, 19, 20, 21, 22, 23, or more), preferably at least 17 (e.g., 17, 18, 19, 20, 21, 22, 23, or more), more preferably at least 20 (e.g., 20, 21, 22, 23, or more). In certain embodiments of the first and second embodiments, the rubber composition for the tire tread has a stiffness as measured by E' at 30° C. of at least 14 (e.g., 14, 15, 16, 17, 18, 19, 20, 21, 22, 23, 24, or more), preferably at least 17 (e.g., 17, 18, 19, 20, 21, 22, 23, 24, or more), more preferably at least 20 (e.g., 20, 21, 22, 23, 24, or more). In certain embodiments of the first and second embodiments, the rubber composition for the tire tread has a stiffness as measured by E' at 30° C. of 15-25, 15-23, or 15-20, preferably 17-25, 17-23, or 17-20, more preferably 20-30, 20-25, or 20-23. In certain embodiments of the first and second embodiments, the rubber composition for the tire tread has a stiffness as measured by E' at 30° C. of 14-25, 14-23, or 14-20, preferably 17-25, 17-23, or 17-20, more preferably 20-30, 20-25, or 20-23.

In certain embodiments of the first and second embodiments, the rubber composition for the tire tread has a wet performance as measured by tan 6 at 0° C. of at least 0.45 (e.g., 0.45, 0.46, 0.47, 0.48, 0.49, 0.5, 0.51, 0.52, 0.53, 0.54, 0.55, 0.56, 0.57, 0.58, 0.59, 0.6, 0.65, 0.7 or more), preferably at least 0.5 (e.g., 0.5, 0.51, 0.52, 0.53, 0.54, 0.55, 0.56, 0.57, 0.58, 0.59, 0.6, 0.61, 0.62, 0.63, 0.64, 0.65, 0.7 or more), more preferably at least 0.55 (e.g., 0.55, 0.56, 0.57, 0.58, 0.59, 0.6, 0.61, 0.62, 0.63, 0.64, 0.65, 0.7, 0.75 or more). In certain embodiments of the first and second embodiments, the rubber composition for the tire tread has a wet performance as measured by tan 6 at 0° C. of 0.45-0.8, 0.45-0.75, or 0.45 to 0.7, preferably 0.5-0.8, 0.5-0.75, or 0.5-0.7, more preferably 0.55-0.8, 0.55-0.75, or 0.55-0.7. In preferred certain embodiments of the first and second embodiments, the rubber composition for the tire tread has a wet performance falling within one of the foregoing ranges in combination with a stiffness falling within one of the foregoing ranges; in certain such embodiments, the wet performance and stiffness both fall within the foregoing preferred (or more preferred) ranges.

In certain embodiments of the first and second embodiments, the rubber composition for the tire tread has a rolling resistance as measured by tan 6 at 60° C. of no more than 0.45 (e.g., 0.45, 0.41, 0.4, 0.39, 0.38, 0.37, 0.36, 0.35, 0.34, 0.33, 0.32, 0.31, 0.3, 0.25, or less), preferably no more than 0.4 (e.g., 0.4, 0.39, 0.38, 0.37, 0.36, 0.35, 0.34, 0.33, 0.32, 0.31, 0.3, 0.25, or less), more preferably no more than 0.36 (e.g, 0.36, 0.35, 0.34, 0.33, 0.32, 0.31, 0.3, 0.25, or less). In certain embodiments of the first and second embodiments, the rubber composition for the tire tread has a rolling resistance as measured by tan 6 at 60° C. of 0.2-0.45, 0.25-0.45 or 0.3-0.45, preferably 0.2-0.4, 0.25-0.4, or 0.3-0.4, more preferably 0.2-0.36, 0.25-0.36, or 0.3-0.36. In certain preferred embodiments of the first and second embodiments, the rubber composition for the tire tread has a rolling resistance falling within one of the foregoing ranges in combination with a stiffness falling within one of the foregoing ranges; in certain such embodiments, the stiffness falls within the foregoing preferred (or more preferred) ranges. In certain particularly preferred embodiments of the first and second embodiments, the rubber composition for the tire tread has a stiffness, wet performance and rolling resistance falling within one of the foregoing ranges; in certain such embodiments, the stiffness and wet performance both fall within the foregoing preferred (or most preferred) ranges.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." All references, including but not limited to patents, patent applications, and non-patent literature are hereby incorporated by reference herein in their entirety. While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A tire comprising a tread made from a rubber composition comprising:

100 parts of an elastomer component including at least one rubber selected from the group consisting of styrene-butadiene copolymer, polybutadiene, natural rubber, and polyisoprene, wherein the elastomer component includes more than 60 parts of polybutadiene having a cis-bond content of at least 95% and a Tg of less than −101° C., 20 to 60 phr of a resin component comprising (i) a terpene phenol resin having a hydroxyl value of 80 or greater and (ii) a DCPD-based resin that is not hydrogenated and that has a minority by weight of DCPD monomers, wherein the terpene phenol resin (i) comprises a majority by weight of the resin component, a filler component comprising 91 to 140 phr of a reinforcing silica filler, and 1 to 20 phr of a carbon black filler, wherein the filler component contains 0 phr of titanium oxide, 0 to 30 phr of a liquid plasticizer, and a cure package.

2. The tire of claim 1, wherein the terpene phenol resin is present in an amount of 19-50 phr.

3. The tire of claim 1, wherein the reinforcing silica filler has a BET surface area of about 140 to about 230 $m^2/g$.

4. The tire of claim 1, wherein the reinforcing silica filler has a BET surface area of about 100 to about 140 $m^2/g$.

5. The tire of claim 1, wherein the elastomer component includes at least 70 parts of polybutadiene having a cis-bond content of at least 95% and a Tg of less than −101° C.

6. The tire of claim 1, wherein the elastomer component includes at least 20 phr of styrene-butadiene having a silica-reactive functional group.

7. The tire of claim 1, wherein the rubber composition of the tread includes 10-40 phr of liquid plasticizer.

8. The tire of claim 1, wherein the elastomer component includes a styrene-butadiene copolymer having a Tg of about −70 to about −50° C.

9. The tire of claim 1, wherein the filler component includes no more than 10 phr of reinforcing carbon black filler.

10. The tire of claim 1, wherein the tread rubber composition has a wet performance as measured by tan 6 at 0° C. of at least 0.45, and a stiffness as measured by E' at 30° C. of at least 14.

11. A tire comprising a tread made from a tread rubber composition comprising 100 parts of an elastomer component including at least one rubber selected from the group consisting of styrene-butadiene copolymer, polybutadiene, natural rubber, and polyisoprene, wherein more than 60 parts of the elastomer component comprises polybutadiene having a cis-bond content of at least 95% and a Tg of less than −101° C., 20 to 60 phr of a resin component comprising (i) a terpene phenol resin having a hydroxyl value of 80 or greater and (ii) a DCPD-based resin that is not hydrogenated and that has a minority by weight of DCPD monomers, wherein the terpene phenol resin (i) comprises a majority by weight of the resin component, a filler component comprising 91 to 140 phr of a reinforcing silica filler, and 1 to 20 phr of a carbon black filler, wherein the filler component contains 0 phr of titanium oxide, 0 to 30 phr of a liquid plasticizer, and a cure package.

12. The tire of claim 11, wherein the tread rubber composition has a rolling resistance as measured by tan 6 at 60° C. of no more than 0.4.

13. The tire of claim 11, wherein the terpene phenol resin is present in an amount of 20-50 phr.

14. The tire of claim 11, wherein the elastomer component includes a styrene-butadiene copolymer having a Tg of about −65 to about −40° C.

15. The tire of claim 11, wherein the tread rubber composition has a wet performance as measured by tan 6 at 0° C. of at least 0.45, and a stiffness as measured by E' at 30° C. of at least 14.

16. The tire of claim 11, wherein the elastomer component includes a styrene-butadiene copolymer having a Tg of about −70 to about −50° C.

17. The tire of claim 1, wherein the carbon black filler is reinforcing and the filler component includes no more than 5 phr of additional reinforcing filler.

18. The tire of claim 11, wherein the carbon black filler is reinforcing and the filler component includes no more than 5 phr of additional reinforcing filler.

* * * * *